US010230884B2

(12) United States Patent
Okada

(10) Patent No.: US 10,230,884 B2
(45) Date of Patent: Mar. 12, 2019

(54) ELECTRONIC APPARATUS, SYSTEM, STORAGE CONTROL METHOD, AND STORAGE MEDIUM

(71) Applicant: CASIO COMPUTER CO., LTD., Tokyo (JP)

(72) Inventor: Takeshi Okada, Tokyo (JP)

(73) Assignee: CASIO COMPUTER CO., LTD., Tokyo (JP)

(*) Notice: Subject to any disclaimer, the term of this patent is extended or adjusted under 35 U.S.C. 154(b) by 0 days.

(21) Appl. No.: 15/266,858

(22) Filed: Sep. 15, 2016

(65) Prior Publication Data
US 2017/0085772 A1    Mar. 23, 2017

(30) Foreign Application Priority Data

Sep. 18, 2015  (JP) .................. 2015-185867

(51) Int. Cl.
*G06F 3/16* (2006.01)
*H04N 5/77* (2006.01)
(Continued)

(52) U.S. Cl.
CPC ........... *H04N 5/23203* (2013.01); *G06F 3/16* (2013.01); *H04L 67/02* (2013.01);
(Continued)

(58) Field of Classification Search
CPC .......... H04N 5/23203; H04N 5/23216; H04N 5/907; H04N 5/77; H04N 7/188;
(Continued)

(56) References Cited

U.S. PATENT DOCUMENTS 7,697,827 B2 * 4/2010 Konicek ............... G03B 17/02
396/56
8,564,681 B2 * 10/2013 Yamamoto ............ G03B 17/00
348/222.1
(Continued)

FOREIGN PATENT DOCUMENTS

CN     104853101 A    8/2015
JP    2002-189723 A    7/2002
(Continued)

OTHER PUBLICATIONS

China National Intellectual Property Administration; Application No. 201610821964.1; Office Action dated Dec. 14, 2018.

*Primary Examiner* — Pritham D Prabhakher
(74) *Attorney, Agent, or Firm* — Fitch, Even, Tabin & Flannery LLP

(57) ABSTRACT

Photographed pictures are uploaded to an appropriate location easily without complicated operations. A photographing terminal includes a photographing control unit, an input detection unit, a photographing control unit, and a communication control unit. The photographing control unit acquires an image. The input detection unit acquires a predetermined sound generated from a user. The photographing control unit controls so as to acquire an image based on a sound that is the same as the predetermined sound acquired by the input detection unit. The communication control unit controls to store an image in a storage destination which is set in advance according to contents of the sound that is the same as the predetermined sound acquired by the input detection unit.

16 Claims, 15 Drawing Sheets

(51) Int. Cl.
  *H04N 7/18* (2006.01)
  *G10L 15/26* (2006.01)
  *H04L 29/06* (2006.01)
  *H04L 29/08* (2006.01)
  *H04N 5/232* (2006.01)
(52) U.S. Cl.
  CPC ........... *H04N 5/23216* (2013.01); *H04N 5/77* (2013.01); *H04N 7/188* (2013.01); *G10L 15/26* (2013.01); *H04L 67/42* (2013.01)
(58) Field of Classification Search
  CPC . G06F 3/16; H04L 67/02; H04L 67/42; G10L 15/265; G10L 15/26
  USPC ...................................................... 348/211.4
  See application file for complete search history.

(56) References Cited

U.S. PATENT DOCUMENTS

| | | | | |
|---|---|---|---|---|
| 8,700,392 B1* | 4/2014 | Hart | ............... | G10L 15/25 704/231 |
| 9,704,484 B2* | 7/2017 | Iwai | ............... | G10L 15/25 |
| 9,747,900 B2* | 8/2017 | Zurek | ............... | G10L 15/22 |
| 2004/0267521 A1* | 12/2004 | Cutler | ............... | G10L 15/25 704/202 |
| 2005/0102133 A1* | 5/2005 | Rees | ............... | G03B 17/00 704/205 |
| 2005/0128311 A1* | 6/2005 | Rees | ............... | G03B 17/00 348/211.99 |
| 2009/0253463 A1* | 10/2009 | Shin | ............... | H04M 1/72583 455/563 |
| 2011/0257971 A1* | 10/2011 | Morrison | ............... | G06K 9/00221 704/233 |
| 2013/0124207 A1* | 5/2013 | Sarin | ............... | G10L 15/22 704/275 |
| 2013/0339024 A1* | 12/2013 | Kojima | ............... | G08G 1/123 704/270.1 |
| 2014/0028826 A1* | 1/2014 | Lee | ............... | G10L 15/25 348/77 |
| 2014/0160316 A1 | 6/2014 | Hwang | | |
| 2014/0192211 A1* | 7/2014 | Konicek | ............... | G03B 17/02 348/207.1 |
| 2014/0267742 A1 | 9/2014 | Tapia et al. | | |
| 2015/0078606 A1* | 3/2015 | Zhang | ............... | H04M 1/035 381/365 |
| 2015/0206535 A1* | 7/2015 | Iwai | ............... | G10L 15/25 704/231 |
| 2016/0085266 A1* | 3/2016 | Lee | ............... | H04N 5/2628 348/240.2 |
| 2016/0329053 A1* | 11/2016 | Grahm | ............... | G06F 1/163 |

FOREIGN PATENT DOCUMENTS

| | | |
|---|---|---|
| JP | 2009-10987 A | 1/2009 |
| JP | 2012-100214 A | 5/2012 |

\* cited by examiner

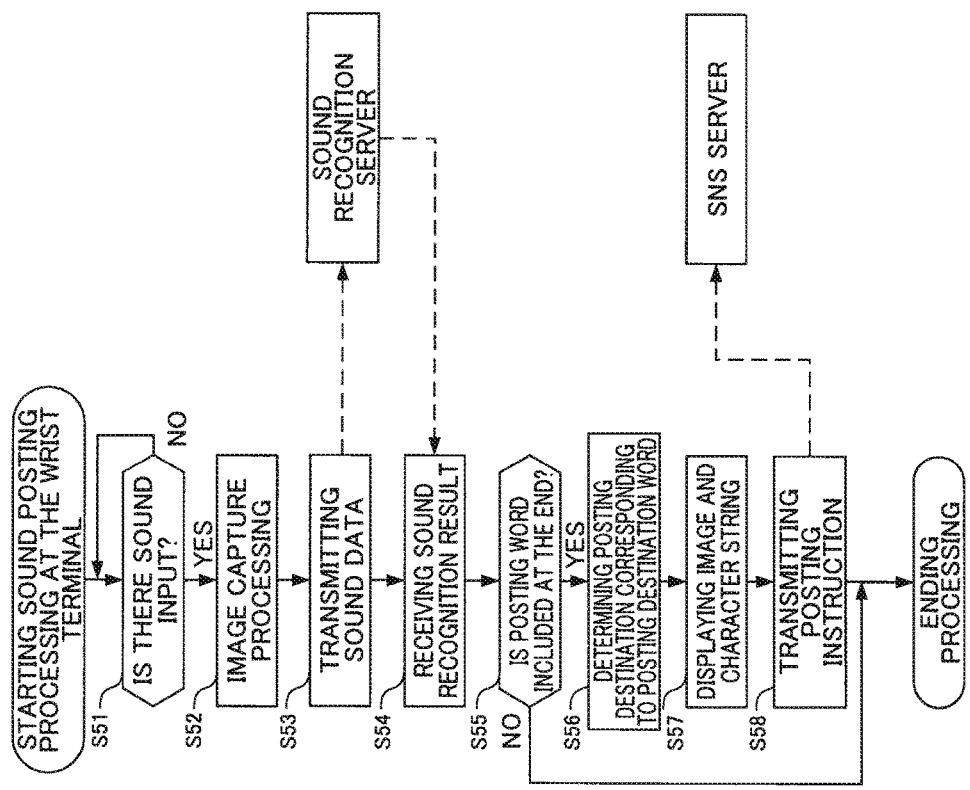

ELECTRONIC APPARATUS, SYSTEM, STORAGE CONTROL METHOD, AND STORAGE MEDIUM

CROSS-REFERENCE TO RELATED APPLICATION

This application is based upon and claims the benefit of priority under 35 USC 119 of Japanese Patent Application No. 2015-185867 filed on Sep. 18, 2015 the entire disclosure of which, including the description, claims, drawings, and abstract, is incorporated herein by reference in its entirety.

BACKGROUND OF THE INVENTION

Field of the Invention

The present invention relates to an electronic apparatus, a system, a storage control method, and a program.

Related Art

Conventionally, there is camera technology for performing photographing control by voice, without manual operation, as in Japanese Unexamined Patent Application, Publication No. 2012-100214 and Japanese Unexamined Patent Application, Publication No. 2009-10987, for example. In addition, as in Japanese Unexamined Patent Application, Publication No. 2002-189723, there is a technology for uploading pictures photographed to a predetermined server on the Web. There are also services such as using social networking services (SNS) using the technology.

SUMMARY OF THE INVENTION

One aspect of the present invention is electronic apparatus comprising: an image acquisition section that acquires an image; a sound acquisition section that acquires a predetermined sound generated from a user; and a computing device which is operable to function as units including: an image acquisition control unit that controls the image acquisition section so as to acquire the image based on a sound that is the same as the predetermined sound acquired by the sound acquisition section; and a storage control unit that performs control to store the image in a storage destination which is set in advance according to contents of the sound that is the same as the predetermined sound acquired by the sound acquisition section. Another aspect of the present invention is a storage control method executed by an electronic apparatus, the method comprising the steps of: acquiring an image; acquiring a predetermined sound generated from a user; controlling so as to acquire the image in the step of acquiring an image based on a sound that is the same as the predetermined sound acquired in the step of acquiring the sound; and controlling to store the image in a storage destination which is set in advance according to contents of the sound that is the same as the predetermined sound acquired in the step of acquiring the sound. Yet another aspect of the present invention is a non-transitory storage medium encoded with a computer-readable program that enables a computer to execute functions as: an image acquisition unit that acquires an image; a sound acquisition unit that acquires a predetermined sound generated from a user; an image acquisition control unit that controls the image acquisition unit so as to acquire the image based on a sound that is the same as the predetermined sound acquired by the sound acquisition unit; and a storage control unit that performs control to store the image in a storage destination which is set in advance according to contents of the sound that is the same as the predetermined sound acquired by the sound acquisition unit.

BRIEF DESCRIPTION OF THE DRAWINGS

The accompanying drawings, which are incorporated in and constitute a part of the specification, illustrate embodiments of the invention, and together with the general description given above and the detailed description of the embodiments given below, serve to explain the principles of the invention.

FIG. 16 is a flowchart illustrating a flow of sound posting processing executed by the photographing terminal of FIG. 14, which has the functional configurations of FIG. 15.

DETAILED DESCRIPTION OF THE INVENTION

In the following, embodiments of the present invention will be described with reference to the drawings.

First Embodiment

Figure 1:
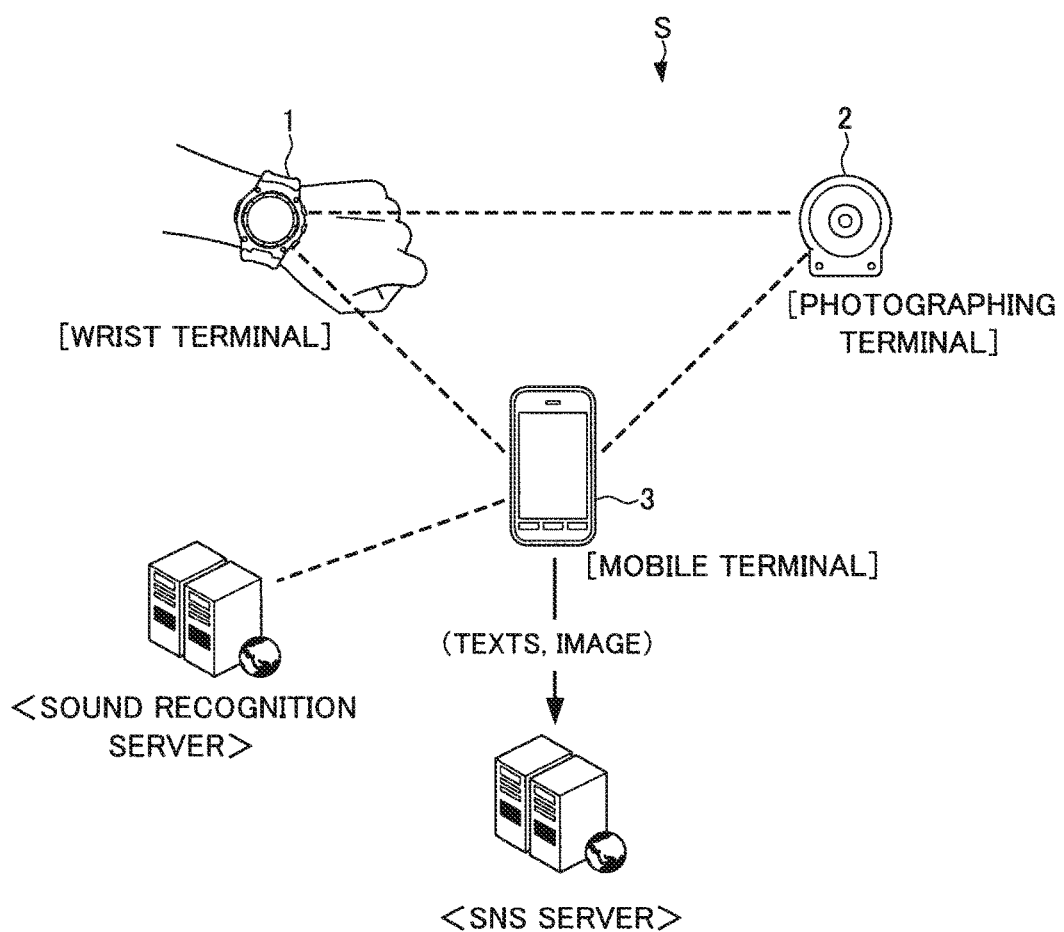
FIG. 1 is a system configuration view illustrating a system configuration of a posting system according to an embodiment of the present invention.

FIG. 1 is a system configuration view illustrating a system configuration of a posting system according to an embodiment of the present invention.

As illustrated in FIG. 1, a posting system S according to the present embodiment includes a wrist terminal 1, a photographing terminal 2, and a mobile terminal 3.

In the posting system S of the present embodiment, a posting instruction, an input of posting contents, and a photographing instruction are performed by way of one sound input. Then, posting is performed by transmitting text of the posting contents created and an image photographed to an SNS (Social Networking Service) server.

The wrist terminal 1 constituting the posting system S is used by being worn on an arm of a user. The wrist terminal 1 has a sound input function, an image display function, and a communication function.

The wrist terminal 1 performs a sound input, and then performs a photographing instruction, a sound recognition instruction of the sound inputted, and a posting instruction to a posting destination according to a sound recognition result, to the mobile terminal 3. It should be noted that the posting contents refer to a character string of the sound recognition result and an image obtained by the photographing instruction.

In addition, the photographing terminal 2 constituting the posting system S is used by being mounted to a bag, clothes, hat, etc. of a user, and has a communication function and a photographing function.

The photographing terminal 2 performs photography based on the photographing instruction from the wrist terminal 1, and transmits images to the wrist terminal 1.

In addition, the mobile terminal 3 constituting the posting system S is carried by a user.

The mobile terminal 3 has a communication function. At the mobile terminal 3, based on the sound recognition instruction from the wrist terminal 1, a sound recognition result of the sound inputted from an external sound recognition server is obtained and transmitted to the wrist terminal 1. In addition, at the mobile terminal 3, based on the posting instruction from the wrist terminal 1, posting is performed by transmitting posting contents to an SNS server as a designated posting destination.

The photographing instruction and the sound recognition result for creating an image and a character string of posting contents, and sound contents for determining the posting destination refer to contents at the end of the overall sound contents subsequent to arbitrary contents. In other words, the overall sound contents are composed of "arbitrary sound contents"+"end: specific sound contents", and the sound contents that determine the posting destination are "end: specific sound contents". A determination is not made based on the overall sound contents inputted, but rather made based on the sound contents of the portion at the end. In the present embodiment, the sound contents are treated as character strings and, in a case in which a character string at the end of the character string corresponding to the sound inputted is a specific character string (predetermined character string+specific character string at the end), the present function operates.

Although it is possible for a user to set the specific character string at the end arbitrarily, a keyword is set which is directly or indirectly associated with the posting destination as a storage destination in the present embodiment. In addition, it is configured so as to use a word that is used commonly or officially at the posting destination.

More specifically, in the case of Twitter (Registered Trademark), when performing sound input of contents which a user wants to post and of the word "now" at the end which is commonly used in Twitter (Registered Trademark) and represents what the user is currently doing, a text of the posting contents and an image photographed when performing sound input are posted to the user's account of Twitter (Registered Trademark).

In other words, in a case in which a sound inputted is " . . . now", the sound is posted to the user's account (a specific posting destination), and an image photographed when performing sound input and a text of " . . . now" are posted to the user's account of Twitter (Registered Trademark).

In addition, in the case of Facebook (Registered Trademark), when performing sound input of contents which a user wants to post and of a word "like" at the end, which is officially provided by Facebook (Registered Trademark) and clicked when praising another user, a text of the posting contents and an image photographed when performing sound input are posted to the user's account of Facebook (Registered Trademark).

In other words, in a case in which a sound inputted is " . . . like", the sound is posted to the user's account (a specific posting destination), and an image photographed when performing sound input and a text of " . . . like" are posted to the user's account of Facebook (Registered Trademark).

By setting such keywords associated with posting destinations at the end of the sound as words that discriminate posting, designation of a posting destination, and the like, in this way, the user who performs sound input has only to perform sound input of a specific word at the end of words such as for feeling and impression. Therefore, it is possible to input sound intuitively without being distracted from thoughts of feeling and impression due to considering posting, designation of posting destinations, and the like.

In addition, in a case of generating posting contents after designating the posting destination and generating the word to designate posting, the user may feel discouraged until the time when generating the posting contents. As compared to such a case, by generating the posting contents initially, the user does not feel defensive and can easily generate the posting contents intuitively, a result of which a real-time feeling will not be lost. In addition, by using words that are associated with the posting destinations, and furthermore, used commonly or officially, it is unnecessary to memorize specific words.

In addition, it is also possible to generate only the posting contents intuitively, and then to generate words for selecting a posting destination according to the posting contents so as to adjust the posting destination.

Figure 2:
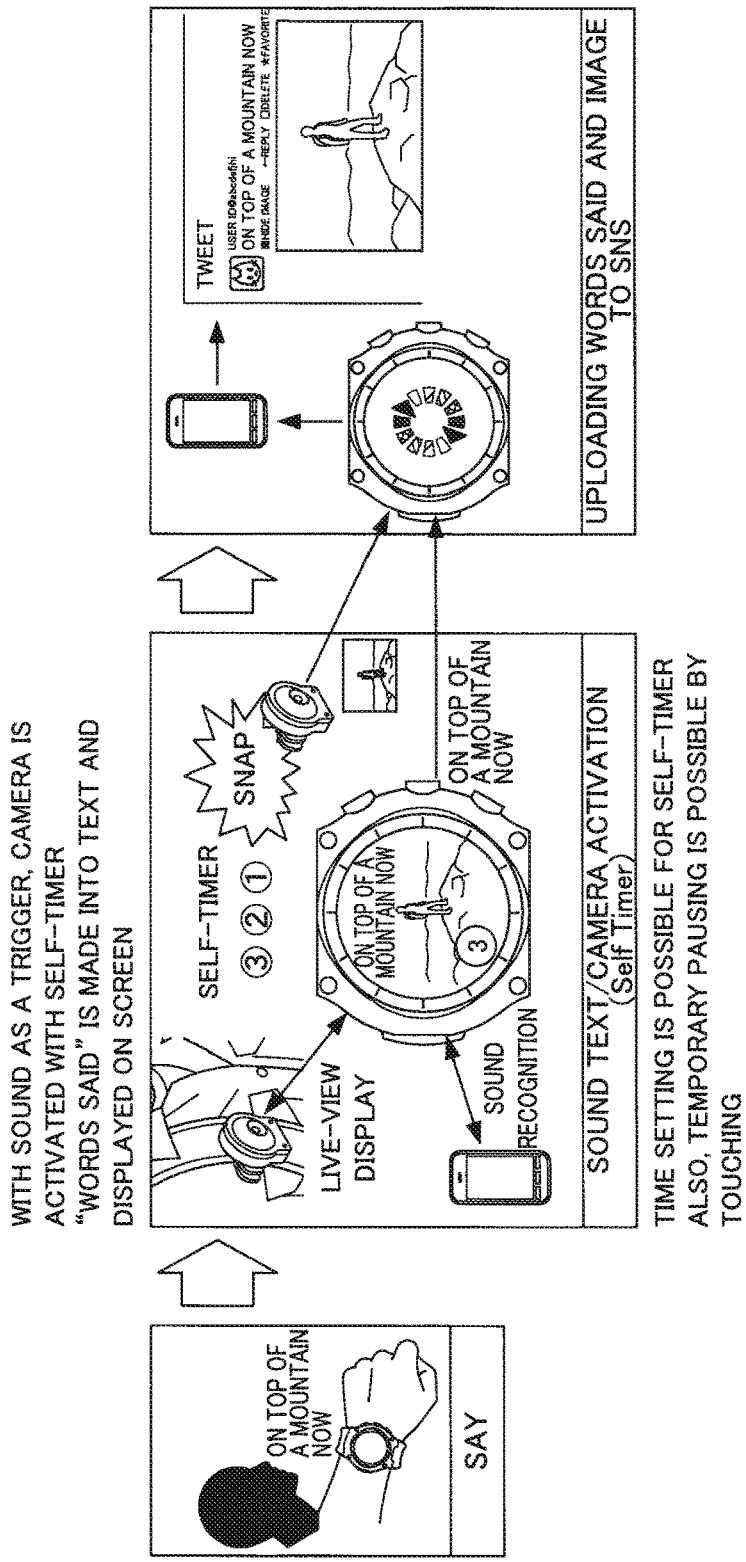
FIG. 2 is a schematic view illustrating a sound posting executed by the posting system according to the present embodiment.

FIG. 2 is a schematic view illustrating a sound posting executed by a posting system S according to the present embodiment.

As illustrated in FIG. 2, in the posting system S according to the present embodiment, for example, by inputting (saying) a sound of "on the top of the mountain now" to the wrist terminal 1, the sound is triggered, then self-timer photographing is performed by the photographing terminal 2, and sound recognition of the sound inputted is performed by the mobile terminal 3. Thereafter, the sound (words said) is converted into text and displayed on a screen of the wrist terminal 1 along with the photographed image. In addition, by operating (touch operation) the wrist terminal 1 during the self-timer, it is configured to be possible to temporarily stop photographing or cancel posting. In addition, it is configured to be able to change a time setting of the self-timer arbitrarily.

Finally, the words said and the image displayed on the screen of the wrist terminal 1 are posted by uploading to an SNS server, and published as the user's tweet.

Figure 3:
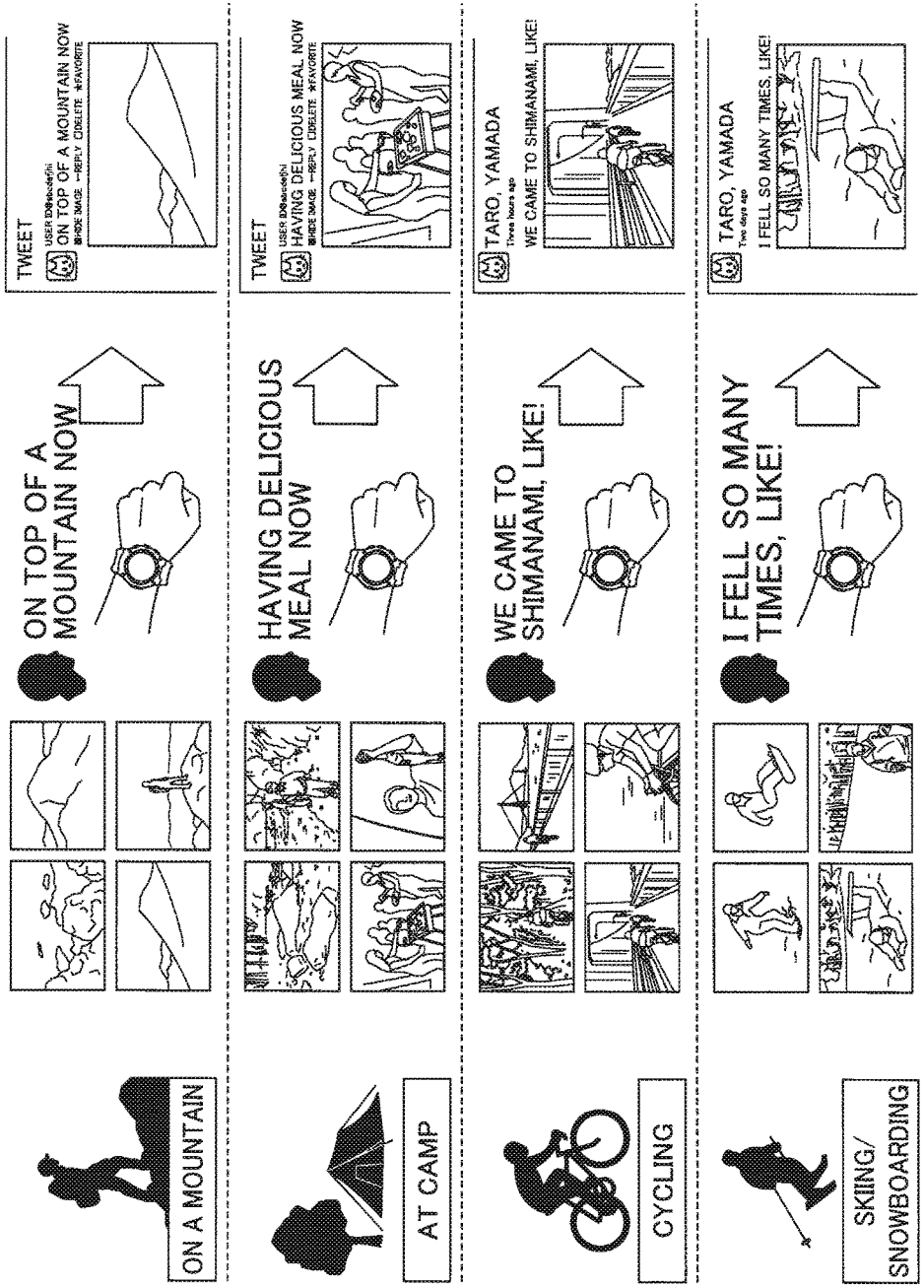
FIG. 3 is a schematic view illustrating scenes of using sound posting according to the present embodiment.

FIG. 3 is a schematic view illustrating scenes of using sound posting according to the present embodiment.

As illustrated in FIG. 3, there are a variety of scenes of using sound posting according to the present embodiment. It functions efficiently in scenes such as "mountain", "camping", "cycling", and "skiing/snowboarding" in which an input operation on a terminal and the like cannot be performed, and scenes accompanying another action.

For example, in the case of climbing, it is difficult to perform a terminal operation such as inputting and photographing. By performing sound input of "on the top of the mountain now" which notifies that the user arrived at the top of the mountain when the user arrived at the top of the mountain, an image around the top of the mountain and the text of "on the top of the mountain" are posted to Twitter (Registered Trademark).

In addition, in the case of having a meal at camp, if performing a terminal operation such as inputting and photographing, the real-time feeling of the impression of the meal will be lost. By performing sound input of "having a delicious meal now" that notifies the impression of the meal immediately after eating, an image of a meal scene and the text of "having a delicious meal now" are posted to Twitter (Registered Trademark).

In addition, in the case of cycling, it is difficult to perform a terminal operation such as in putting and photographing. By performing sound input of "We came to Shimanami, like!" which notifies the name of a current location when arriving at a specific location, an image of a surrounding scene and the text of "We came to Shimanami, like!" are posted to Facebook (Registered Trademark).

In addition, in the case of skiing or snowboarding, it is difficult to perform a terminal operation such as inputting and photographing. By performing sound input of "I fell so many times, like!" which notifies an impression when a specific scene such as falling happens, an image capturing the specific scene and the text of "I fell so many times, like!" are posted to Facebook (Registered Trademark).

Figure 4:
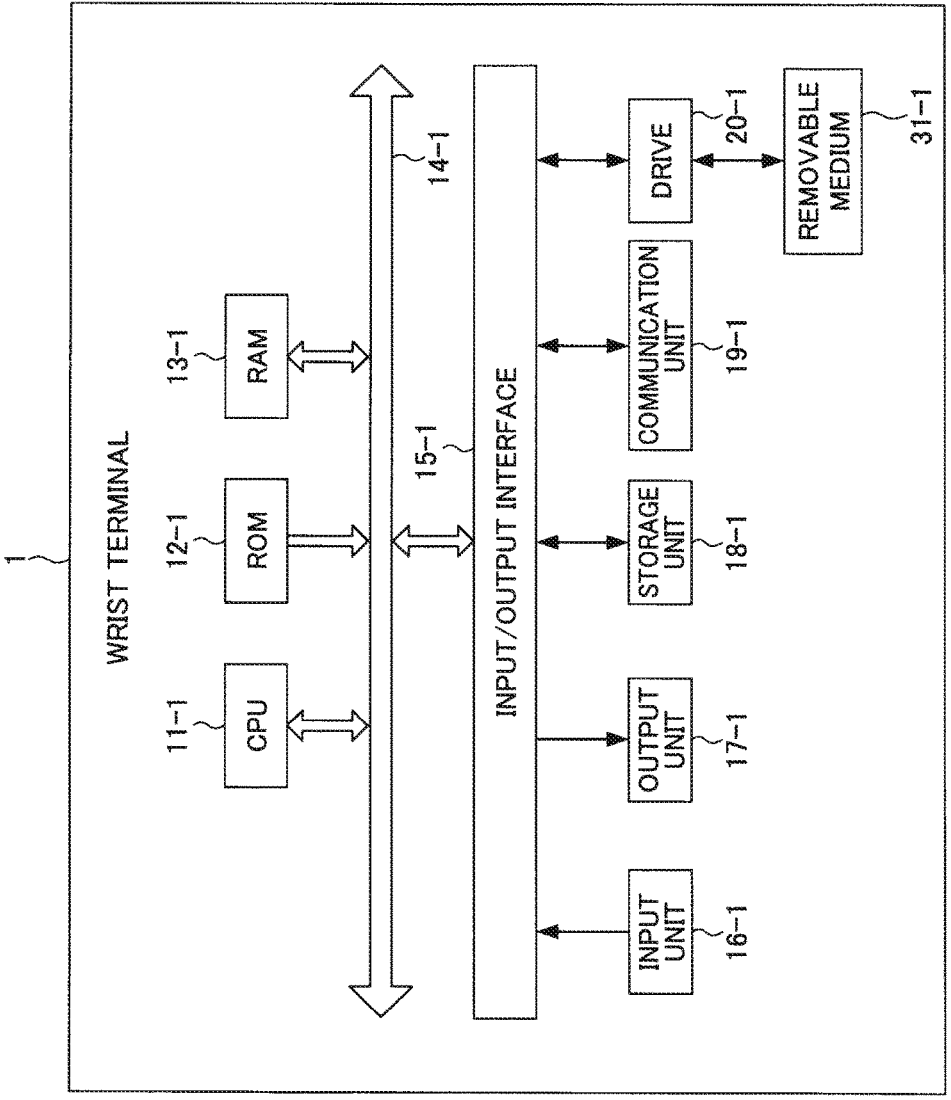
FIG. 4 is a block diagram illustrating a hardware configuration of a wrist terminal of the posting system according to the present embodiment.

FIG. 4 is a block diagram illustrating the hardware configuration of the wrist terminal 1 of the posting system S of the present embodiment.

The wrist terminal 1 is configured as, for example, a smart watch.

The wrist terminal 1 includes a CPU (Central Processing Unit) 11-1, ROM (Read Only Memory) 12-1, RAM (Random Access Memory) 13-1, a bus 14-1, an input/output interface 15-1, an input unit 16-1, an output unit 17-1, a storage unit 18-1, a communication unit 19-1, and a drive 20-1.

The CPU 11-1 executes various processing according to programs that are recorded in the ROM 12-1, or programs that are loaded from the storage unit 18-1 to the RAM 13-1.

The RAM 13-1 also stores data and the like necessary for the CPU 11-1 to execute the various processing, as appropriate.

The CPU 11-1, the ROM 12-1 and the RAM 13-1 are connected to one another via the bus 14-1. The input/output interface 15-1 is also connected to the bus 14-1. The input unit 16-1, the output unit 17-1, the storage unit 18-1, the communication unit 19-1, and the drive 20-1 are connected to the input/output interface 15-1.

The input unit 16-1 is configured by a touch screen and inputs a variety of information in accordance with instruction operations by the user.

In addition, the input unit 16-1 is configured by a microphone and inputs sounds produced by a user.

The output unit 17-1 is configured by the display unit, a speaker, and the like, and outputs images and sound.

The storage unit 18-1 is configured by DRAM (Dynamic Random Access Memory) or the like, and stores data of various images.

The communication unit 19-1 controls communication with other devices (not shown) via networks including the Internet. In addition, the communication unit 19-1 is configured so as to be capable of communicating with other terminals via Bluetooth communication (Bluetooth Legacy communication) or Wi-Fi communication. In addition, the communication unit 19-1 is configured so as to be capable of communicating with various kinds of servers via the Internet by way of communication systems such as LTE (Long Term Evolution) or 3G (the third generation mobile communication system), which are communication standards for mobile phones.

A removable medium 31-1 composed of a magnetic disk, an optical disk, a magneto-optical disk, semiconductor memory or the like is installed in the drive 20-1, as appropriate. Programs that are read via the drive 20-1 from the removable medium 31-1 are installed in the storage unit 18-1, as necessary. Similarly to the storage unit 18-1, the removable medium 31-1 can also store a variety of data such as the image data stored in the storage unit 18-1.

Figure 5:
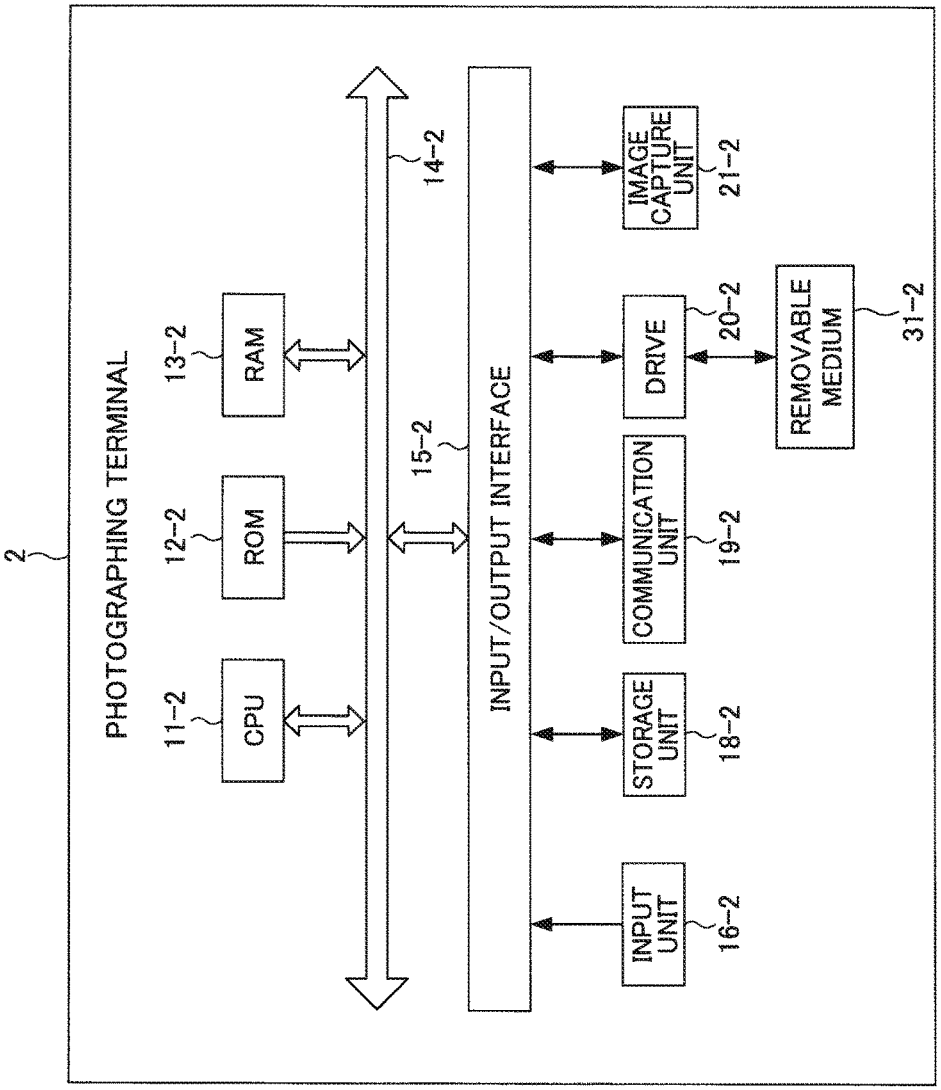
FIG. 5 is a block diagram illustrating a hardware configuration of a photographing terminal of the posting system according to the present embodiment.

FIG. 5 is a block diagram illustrating a hardware configuration of the photographing terminal 2 of the posting system S according to the present embodiment.

The photographing terminal 2 is configured as a digital camera, for example.

As illustrated in FIG. 5, the photographing terminal 2 includes a CPU 11-2 to an image capture unit 21-2. The photographing terminal 2 differs in the point of including the hardware configuration of the image capture unit 21-2 without including a hardware configuration corresponding to the output unit 17-1 of the wrist terminal 1. Explanations for the CPU 11-2 to a drive 20-2 which is a hardware configuration similar to that of the wrist terminal 1 will be omitted.

The image capture unit 21-2 includes an optical lens unit and an image sensor, which are not shown.

In order to photograph a subject, the optical lens unit is configured by a lens such as a focus lens and a zoom lens for condensing light.

The focus lens is a lens for forming an image of a subject on the light receiving surface of the image sensor. The zoom lens is a lens that causes the focal length to freely change in a certain range.

The optical lens unit also includes peripheral circuits to adjust setting parameters such as focus, exposure, white balance, and the like, as necessary.

The image sensor is configured by an optoelectronic conversion device, an AFE (Analog Front End), and the like.

The optoelectronic conversion device is configured by a CMOS (Complementary Metal Oxide Semiconductor) type of optoelectronic conversion device and the like, for example. Light incident through the optical lens unit forms an image of a subject in the optoelectronic conversion device. The optoelectronic conversion device optoelectronically converts (i.e. captures) the image of the subject, accumulates the resultant image signal for a predetermined time interval, and sequentially supplies the image signal as an analog signal to the AFE.

The AFE executes a variety of signal processing such as A/D (Analog/Digital) conversion processing of the analog signal. The variety of signal processing generates a digital signal that is output as an output signal from the image capture unit 21-2.

Such an output signal of the image capture unit 21-2 is hereinafter referred to as "data of a captured image". Data of a captured image is supplied to the CPU 11-2, an image processing unit (not illustrated), and the like as appropriate.

Figure 6:
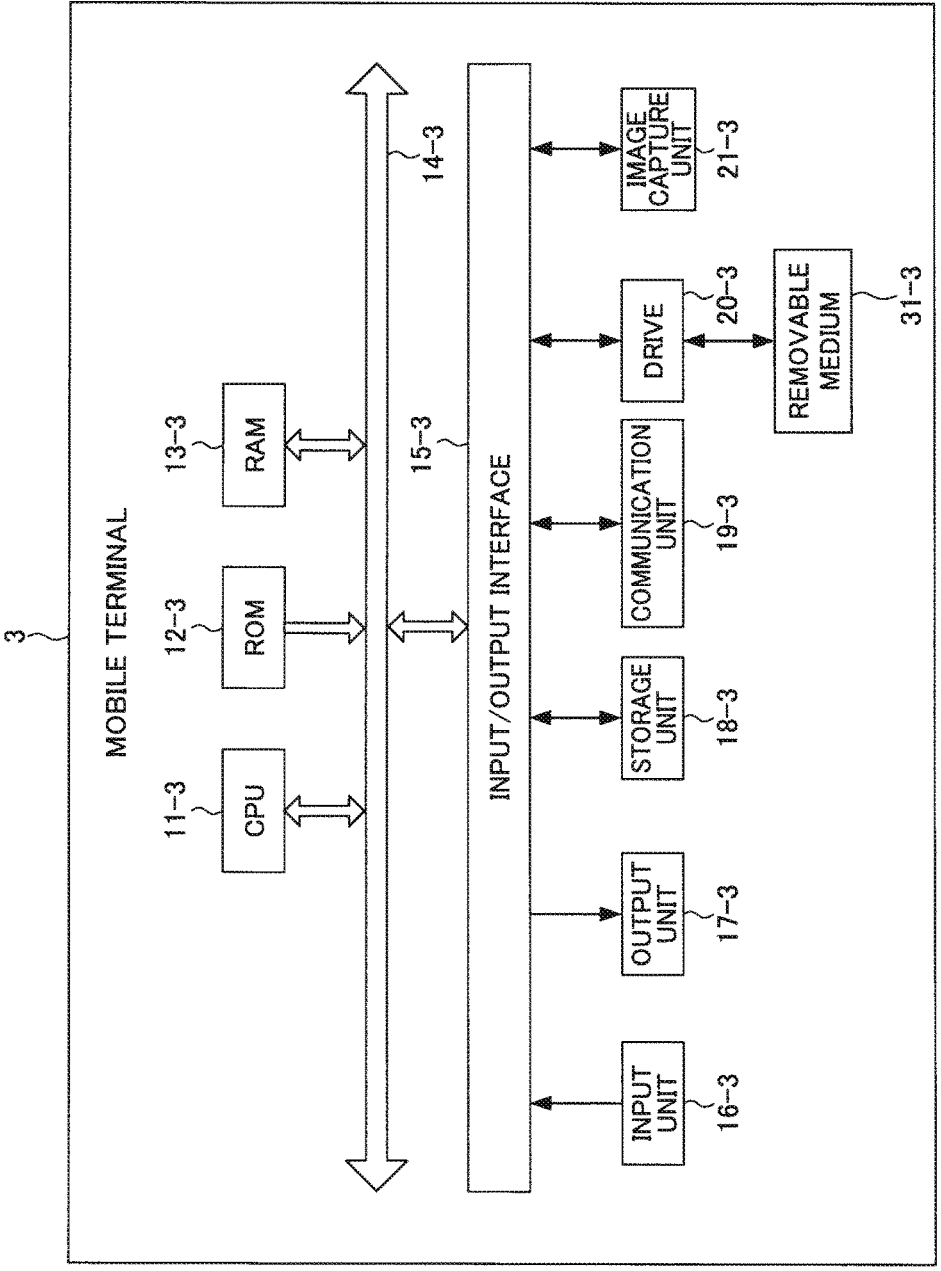
FIG. 6 is a block diagram illustrating a hardware configuration of a mobile terminal of the posting system according to the present embodiment.

FIG. 6 is a block diagram illustrating the hardware configuration of a mobile terminal 3 of the posting system S according to the present embodiment.

The mobile terminal 3 is configured as a smartphone, for example.

Since the hardware configuration of the mobile terminal 3 (CPU 11-3 to an image capture unit 21-3) is identical to the individual hardware configuration of the abovementioned wrist terminal 1 and the photographing terminal 2, explanations thereof will be omitted.

Figure 7:
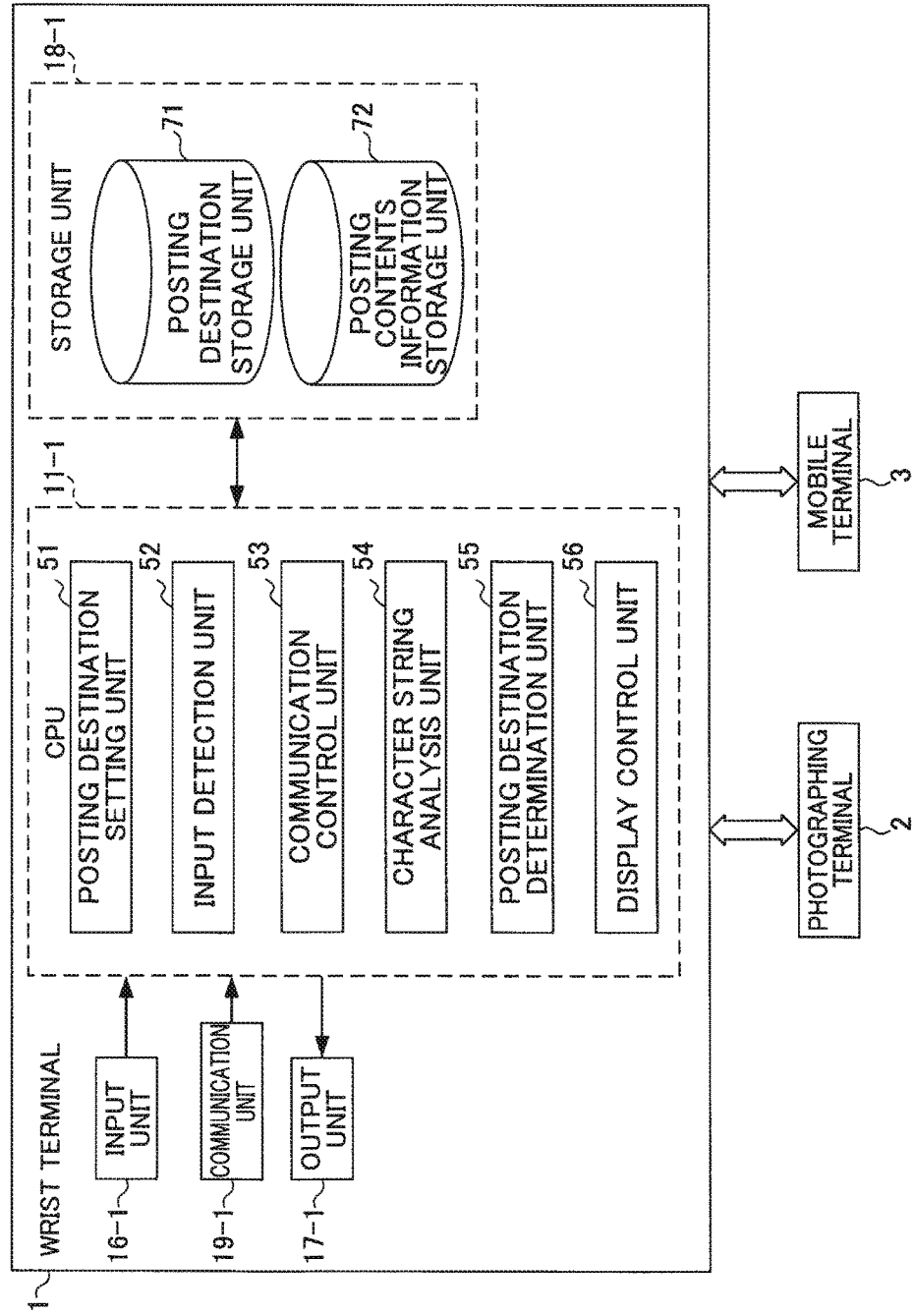
FIG. 7 is a functional block diagram illustrating a functional configuration for executing sound posting processing, among the functional configurations of the wrist terminal of FIG. 4.

FIG. 7 is a functional block diagram illustrating a functional configuration for executing sound posting processing among the functional configurations of the wrist terminal 1 of FIG. 4.

The sound posting processing refers to a sequence of processing of posting character information and an image at the time of sound input to a specific SNS by way of a single sound input.

It should be noted that the configuration according to the present embodiment functions more effectively in such a case without a SIM (Subscriber Identity Module) card in the wrist terminal 1.

As illustrated in FIG. 7, in the case of executing the sound posting processing at the side of the wrist terminal 1, a posting destination setting unit 51, an input detection unit 52, a communication control unit 53, a character string analysis unit 54, a posting destination determination unit 55, and a display control unit 56 function in the CPU 11-1.

In addition, a posting destination storage unit 71 and a posting contents information storage unit 72 are established in a region of the storage unit 18-1.

Posting destination words and posting destinations are associated with each other and stored in the posting destination storage unit 71, and posting information (individual account, mail address for posting, and the like) is stored which is needed for posting to a posting destination. More specifically, in the present embodiment, in the case of the posting destination word being "now", the posting destination is stored as "Twitter" (Registered Trademark), and in the case of the posting destination word being "like", the posting destination is stored as "Facebook" (Registered Trademark), in the posting destination storage unit 71. It should be noted that it is configured so that the posting destination word can be set arbitrarily by a user.

Character strings of the posting contents and image data are stored in the posting contents information storage unit 72.

By way of a setting operation on the input unit 16-1, etc., by the user, the posting destination setting unit 51 associates the posting destination words with the posting destinations, stores them in the posting destination storage unit 71, and sets a posting destination.

The input detection unit 52 detects an input of a sound generated by the user to the input unit 16-1.

More specifically, the input detection unit 52 determines whether an input of sound has been detected via the input unit 16-1 from the user.

The communication control unit 53 controls the communication unit 19-1 so as to perform communication with the photographing terminal 2 and the mobile terminal 3.

More specifically, the communication control unit 53 controls the communication unit 19-1 so as to transmit a photographing instruction to the photographing terminal 2 and transmit a sound recognition instruction and sound data inputted by the sound input to the mobile terminal 3. In addition, the communication control unit 53 controls the communication unit 19-1 so as to receive an image photographed according to the photographing instruction from the photographing terminal 2 and receive a sound recognition result (in the present embodiment, character string data) from the mobile terminal 3. In addition, the communication control unit 53 controls the communication unit 19-1 so as to transmit a posting instruction including a posting destination corresponding to a posting destination word and posting contents (an image and a character string displayed on the output unit 17-1), and image data and character string data to the mobile terminal 3.

The character string analysis unit 54 analyzes a character string which is a sound recognition result.

More specifically, the character string analysis unit 54 analyzes the character string of the sound recognition result, and determines whether a posting destination word is included at the end of the character string which is set as a posting word.

The posting destination determination unit 55 refers to the posting destination storage unit 71, and determines a posting destination corresponding to the posting destination word included at the end of the character string of the sound recognition result.

The display control unit 56 controls the output unit 17-1 so as to display the character string which is set as a posting word and a photographed image which is set as a posting image. The posting word and the posting image are displayed on the output unit 17-1, and thus it is possible for the user to understand the posting contents.

Figure 8:
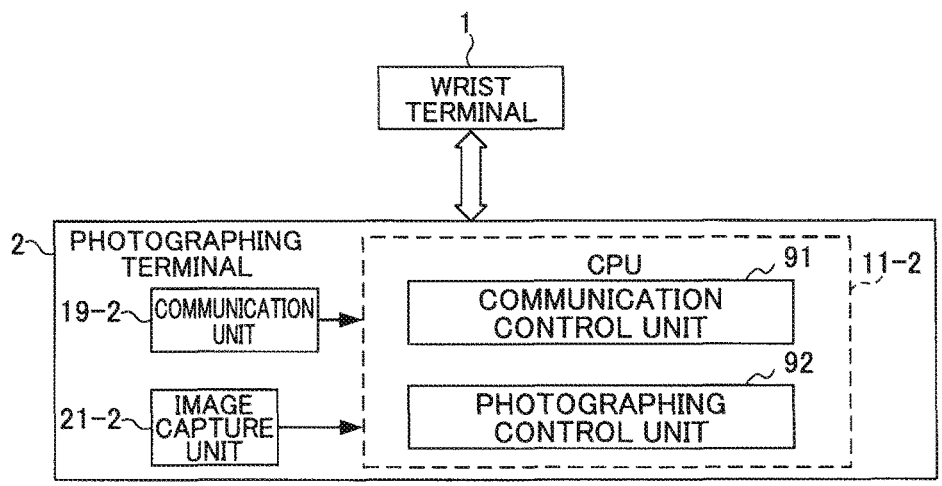
FIG. 8 is a functional block diagram illustrating a functional configuration for executing sound posting processing, among the functional configurations of the photographing terminal of FIG. 5.

FIG. 8 is a functional block diagram illustrating a functional configuration for executing sound posting processing, among the functional configurations of the photographing terminal 2 of FIG. 5.

As illustrated in FIG. 8, in the case of executing the sound posting processing at the side of the photographing terminal 2, a communication control unit 91 and a photographing control unit 92 function in the CPU 11-2.

The communication control unit 91 controls the communication unit 19-2 so as to perform communication with the wrist terminal 1.

More specifically, the communication control unit 91 controls the communication unit 19-2 so as to receive a photographing instruction from the wrist terminal 1. In addition, as a result of the photographing processing, the communication unit 19-2 is controlled so as to transmit an image photographed to the wrist terminal 1.

The photographing control unit 92 controls the image capture unit 21-2 so as to perform image capture processing. As a result, the photographing control unit 92 acquires an image photographed by the image capture unit 21-2.

Figure 9:
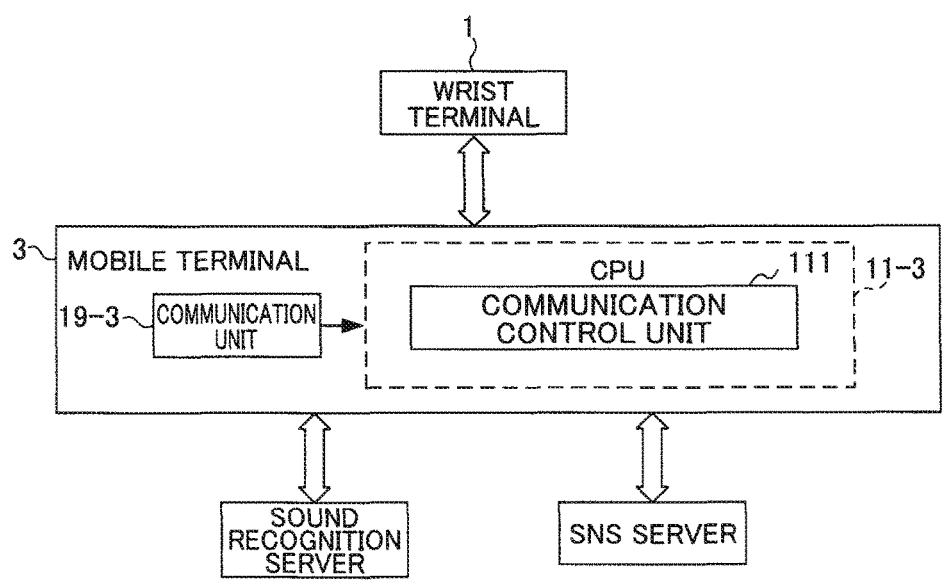
FIG. 9 is a functional block diagram illustrating a functional configuration for executing sound posting processing, among the functional configurations of the mobile terminal of FIG. 6.

FIG. 9 is a functional block diagram illustrating a functional configuration for executing sound posting processing, among the functional configurations of the mobile terminal 3 of FIG. 6.

As illustrated in FIG. 9, in the case of executing the sound posting processing at the side of the mobile terminal 3, a communication control unit 111 functions in the CPU 11-3.

The communication control unit 111 controls the communication unit 19-3 so as to perform communication with the wrist terminal 1, the sound recognition server, and the SNS server.

More specifically, the communication control unit 111 controls the communication unit 19-3 so as to receive a sound recognition instruction and sound data for sound recognition. In addition, the communication control unit 111 controls the communication unit 19-3 so as to transmit the sound recognition instruction and sound data for sound recognition to an external sound recognition server. Furthermore, the communication control unit 111 controls the communication unit 19-3 so as to receive the sound recognition result from an external sound recognition server. Moreover, the communication control unit 111 controls the communication unit 19-3 so as to transmit the sound recognition result to the wrist terminal 1. In addition, the communication control unit 111 controls the communication unit 19-3 so as to receive a posting instruction, and an image data and character string data from the wrist terminal 1. Furthermore, the communication control unit 111 controls the communication unit 19-3 so as to transmit the image data and the character string data which are the posting contents to the SNS server as the posting destination.

Figure 10:
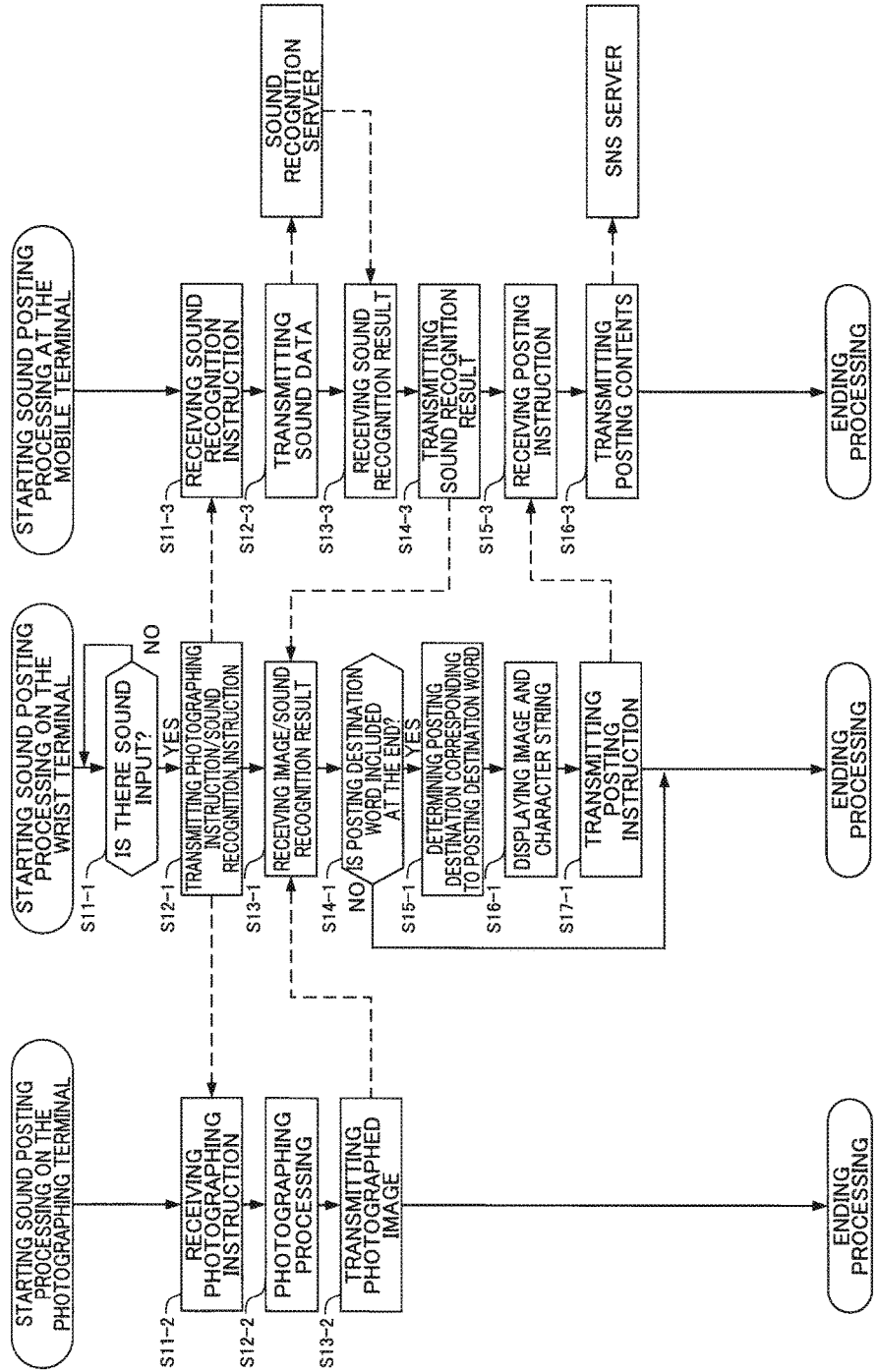
FIG. 10 is a flowchart illustrating a flow of sound posting processing executed by the wrist terminal 1 of FIG. 4, the photographing terminal of FIG. 5, and the mobile terminal of FIG. 6, which have the functional configurations of FIGS. 7 to 9.

FIG. 10 is a flowchart illustrating a flow of sound posting processing executed by the wrist terminal 1 of FIG. 4, the photographing terminal 2 of FIG. 5, and the mobile terminal 3 of FIG. 6, which have the functional configurations of FIGS. 7 to 9. Upon the start of the sound posting processing, a state is established in which a posting destination word is registered in advance by a user by way of the posting destination setting unit 51, i.e. a state in which the posting destination information including an individual account setting and a posting destination word are registered in the posting destination storage unit 71. In addition, a state is set in which connection has been made in a communicable manner to each other among each of the terminals (the wrist terminal 1, the photographing terminal 2, and the mobile terminal 3). Furthermore, the sound posting processing starts when activating a sound posting application by way of a user's operation, etc. to enter a state in which sound input is possible.

It should be noted that, although it is configured to start the sound posting processing by activating the sound posting application to enter the state in which sound input is possible, the present invention is not limited thereto, and thus it may be configured so that all of the operations are performed by way of sound input. For example, it may be configured to start the sound posting processing by automatically activating the sound posting application according to sound input after entering the state in which sound input is possible.

Sound Posting Processing on the Side of the Wrist Terminal 1

In Step S11-1, the input detection unit 52 determines whether sound input has been detected via the input unit 16-1 from a user.

In a case in which the sound input has not been detected, it is determined as NO in Step S11-1, and enters a standby state.

In a case in which the sound input has been detected, it is determined as YES in Step S11-1, and the processing advances to Step S12-1.

In Step S12-1, the communication control unit 53 controls the communication unit 19-1 so as to transmit a photographing instruction to the photographing terminal 2 and transmit a sound recognition instruction and sound data inputted by sound input to the mobile terminal 3.

Thereafter, at the photographing terminal 2, the photographing processing is executed upon the photographing instruction being received. In addition, upon the sound recognition instruction being received at the mobile terminal 3, the sound data is transmitted to an external sound recognition server via the Internet or the like to execute sound recognition.

In Step S13-1, the communication control unit 53 controls the communication unit 19-1 so as to receive an image photographed according to the photographing instruction from the photographing terminal 2, and receive a sound recognition result (in the present embodiment, character string data) from the mobile terminal 3.

In Step S14-1, the character string analysis unit 54 analyzes the character string data received from the mobile terminal 3, refers to the posting destination storage unit 71, and determines whether a posting destination word is included at the end of the character string. More specifically, it determines whether a posting destination word such as "now" and "like" is included at the end of posting words, for example. In a case in which the character string is "on the top of the mountain, now", it is determined that the posting destination word is included at the end and, in a case in which the character string is "on the top of the mountain" or "now on the top of the mountain", it is determined that the posting destination word is not included at the end thereof.

In a case in which the posting destination word is not included at the end of the character string, it is determined as NO in Step S14-1 and the sound posting processing at the side of the wrist terminal 1 ends.

In a case in which the posting destination word is included at the end of the character string, it is determined as YES in Step S14-1, and the processing advances to Step S15-1.

In Step S15-1, the posting destination determination unit 55 refers to the posting destination storage unit 71 and determines a posting destination corresponding to the posting destination word included at the end thereof.

More specifically, as a result of referring to the posting destination storage unit 71, in a case in which the posting destination word is "now", Twitter (Registered Trademark) which has been set is determined as a posting destination, and, in a case in which the posting destination word is "like", Facebook (Registered Trademark) is determined as a posting destination.

In Step S16-1, the display control unit 56 controls the output unit 17-1 so as to output to display an image received from the photographing terminal 2 and a character string received from the mobile terminal 3.

In Step S17-1, the communication control unit 53 controls the communication unit 19-1 so as to transmit, to the mobile terminal 3, a posting instruction including a posting destination corresponding to a posting destination word and posting contents (an image and a character string displayed on the output unit 17-1), and image data and character string data. At the mobile terminal 3, the posting processing is performed, upon the posting instruction being received, by transmitting the image data and the character string data thus received to the SNS server which is set as a posting destination corresponding to the posting destination word. In addition, upon transmitting, the character string and the image data which are the posting contents are stored in the posting contents information storage unit 72.

Thereafter, the sound posting processing at the side of the wrist terminal 1 ends.

Sound Posting Processing on the Side of Photographing Terminal 2

In Step S11-2, the communication control unit 91 controls the communication unit 19-2 so as to receive a photographing instruction from the wrist terminal 1.

In Step S12-2, the photographing control unit 92 executes photographing processing. In the photographing processing according to the present embodiment, photographing is performed after a predetermined lapse of time by means of the self-timer function. It should be noted that it may be configured so as to transmit a live view image to the wrist terminal 1 during the operation of the self-timer.

In Step S13-2, the communication control unit 91 controls the communication unit 19-2 so as to transmit a photographed image to the wrist terminal 1 as a result of the photographing processing. Thereafter, the sound posting processing on the side of the photographing terminal 2 ends.

Sound Posting Processing on the Side of Mobile Terminal 3

In Step S11-3, the communication control unit 111 controls the communication unit 19-3 so as to receive a sound recognition instruction and sound data for sound recognition.

In Step S12-3, the communication control unit 111 controls the communication unit 19-3 so as to transmit the sound recognition instruction and the sound data for sound recognition to an external sound recognition server.

In Step S13-3, the communication control unit 111 controls the communication unit 19-3 so as to receive a sound recognition result from the external sound recognition server.

In Step S14-3, the communication control unit 111 controls the communication unit 19-3 so as to transmit the sound recognition result to the wrist terminal 1.

In Step S15-3, the communication control unit 111 controls the communication unit 19-3 so as to receive a posting instruction, and image data and character string data from the wrist terminal 1.

In Step S16-3, the communication control unit 111 controls the communication unit 19-3 so as to transmit the image data and the character string data, which are posting contents, to an SNS server of a posting destination.

Thereafter, the sound posting processing at the side of the mobile terminal 3 ends.

Second Embodiment

Figure 11:
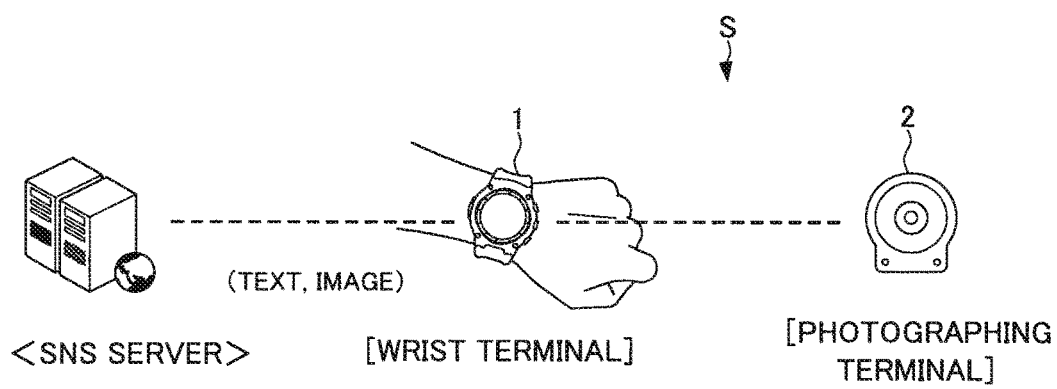
FIG. 11 is a system diagram illustrating a system configuration of a posting system according to the second embodiment.

FIG. 11 is a system diagram illustrating a system configuration of a posting system S according to the second embodiment.

The posting system S according to the present embodiment differs from that of the first embodiment and, as illustrated in FIG. 11, it is configured with a wrist terminal 1 having a sound input function and a posting function, and a photographing terminal 2 having a photographing function. It should be noted that, since the wrist terminal 1 and the photographing terminal 2 are the same as those illustrated in FIG. 7 and FIG. 8 of the first embodiment in terms of the function block, explanations and illustrations thereof will be omitted.

It should also be noted that the configuration of the present embodiment functions more effectively cases with a SIM card in the wrist terminal 1.

Figure 12:
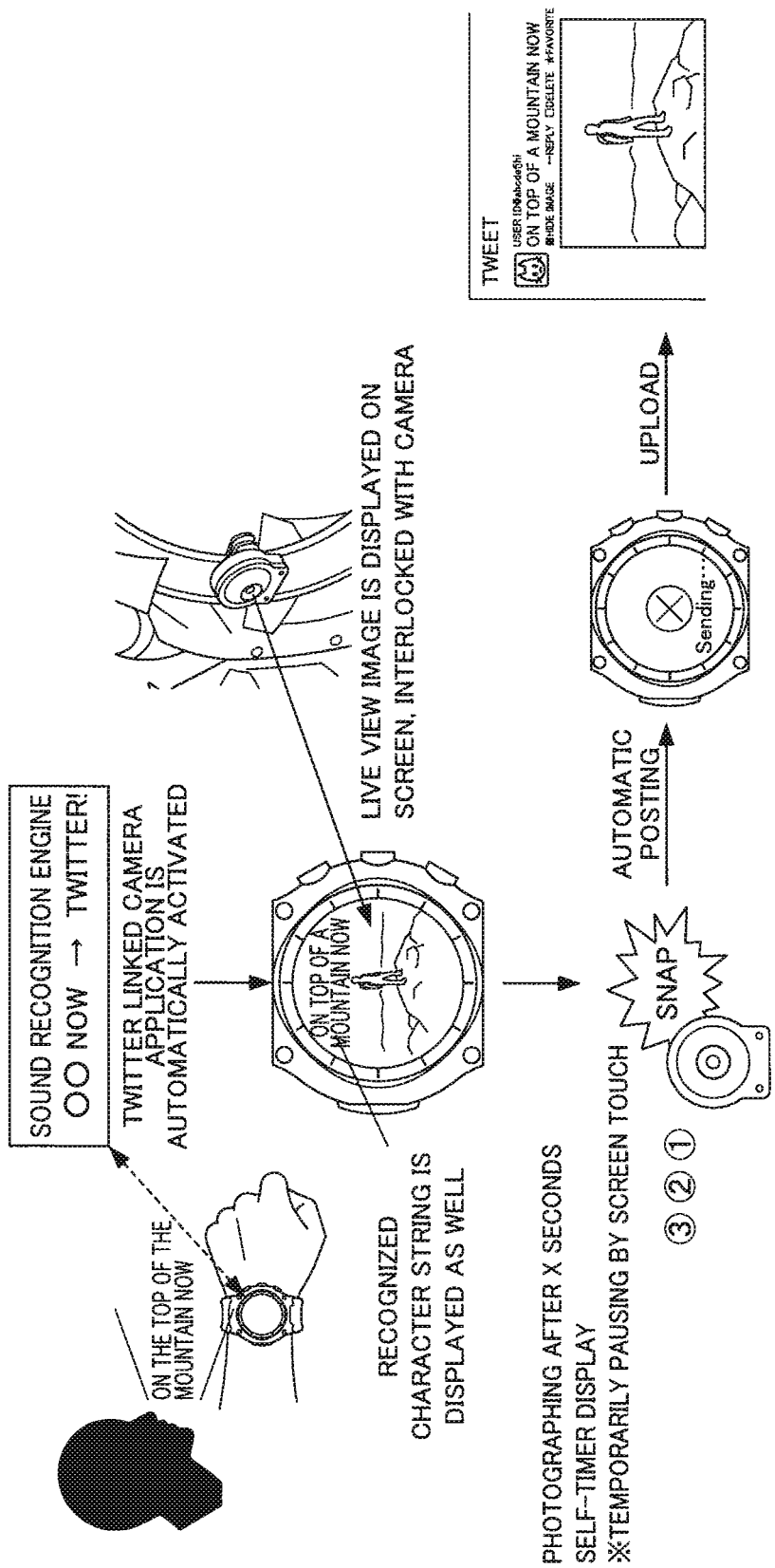
FIG. 12 is a schematic view illustrating sound posting executed by the posting system according to the second embodiment.

FIG. 12 is a schematic view illustrating sound posting executed by the posting system S according to the second embodiment.

In the posting system S according to the present embodiment, as illustrated in the example of FIG. 12, for example, by inputting (saying) a sound of "on top of a mountain now" to the wrist terminal 1, the sound acts as a trigger, then self-timer photographing is performed by the photographing terminal 2, and sound recognition of the sound inputted is performed by the mobile terminal 3.

Thereafter, the character string which was subjected to sound recognition is displayed on a screen of the wrist terminal 1 along with the photographed image. It should be noted that it may be configured so as to display a live view image on the screen of the wrist terminal 1 to photograph after a predetermined lapse of time by performing timer display. In addition, by operating (touch operation) the wrist terminal 1 during the self-timer, it is configured to be possible to temporarily stop photographing. In addition, it is configured to be able to change a time setting of the self-timer arbitrarily.

Finally, the words said and the image displayed on the screen of the wrist terminal 1 are uploaded to an SNS server for posting and published as the user's tweet. In addition, it may be configured so as to cease posting by operating (touch operation) the wrist terminal 1 during transmission of posting data.

Figure 13:
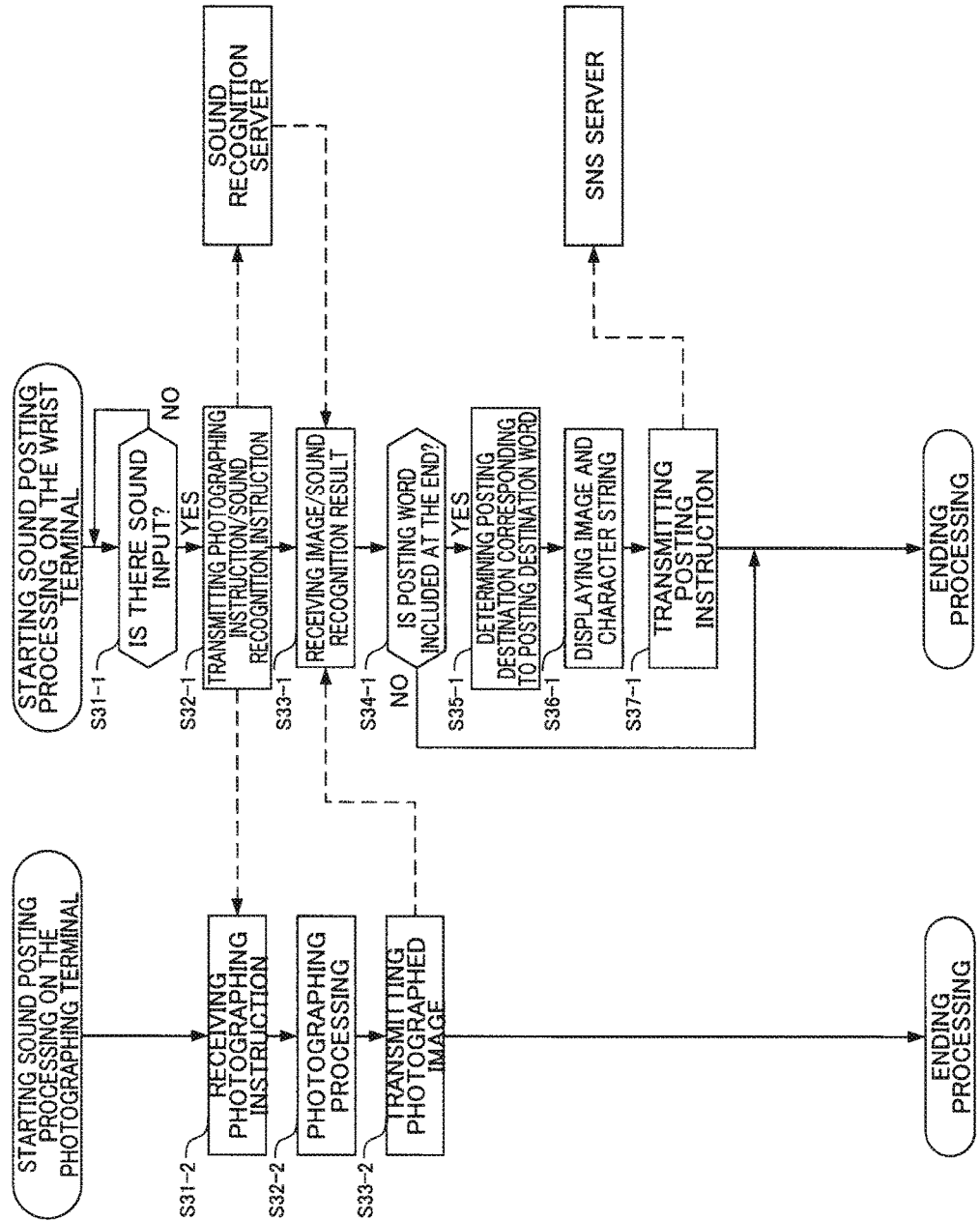
FIG. 13 is a flowchart illustrating a flow of sound posting processing executed by the wrist terminal 1 of FIG. 4 and the photographing terminal of FIG. 5, which have the functional configurations of FIGS. 7 and 8.

FIG. 13 is a flowchart illustrating a flow of sound posting processing executed by the wrist terminal 1 of FIG. 4 and the photographing terminal 2 of FIG. 5, which have the functional configurations of FIGS. 7 and 8. Upon the start of the sound posting processing, a state is established in which a posting destination word is registered in advance by a user by way of the posting destination setting unit 51, i.e. a state in which posting destination information including an individual account setting and a posting destination word are registered in the posting destination storage unit 71. In addition, a state is established in which connection has been made in a communicable manner to each other between the wrist terminal 1 and the photographing terminal 2. In addition, the sound posting processing starts when activating a sound posting application by way of a user's operation, etc. to enter a state in which sound input is possible.

It should be noted that, although it is configured to start the sound posting processing by activating the sound posting application to enter the state in which sound input is possible, the present invention is not limited thereto, and it may be configured so that all of the operations are performed by way of sound input. For example, it may be configured to start the sound posting processing by automatically activating the sound posting application according to sound input after entering the state in which sound input is possible.

Sound Posting Processing on the Side of the Wrist Terminal 1

In Step S31-1, the input detection unit 52 determines whether sound input has been detected via the input unit 16-1 from a user.

In a case in which the sound input has not been detected, it is determined as NO in Step S31-1, and enters a standby state.

In a case in which the sound input has been detected, it is determined as YES in Step S31-1, and the processing advances to Step S32-1.

In Step S32-1, the communication control unit 53 controls the communication unit 19-1 so as to transmit a photographing instruction to the photographing terminal, 2 and transmit sound data inputted by sound input to an external sound recognition server.

Thereafter, the photographing processing executed by the photographing terminal 2 upon the photographing instruction being received. In addition, the sound recognition is executed by the external sound recognition server.

In Step S33-1, the communication control unit 53 controls the communication unit 19-1 so as to receive an image photographed by the photographing instruction from the photographing terminal 2, and receive a sound recognition result (in the present embodiment, character string data) from the external sound recognition server.

In Step S34-1, the character string analysis unit 54 analyzes the character string data received from the external sound recognition server and determines whether a posting destination word is included at the end of the character string.

In a case in which the posting destination word is not included at the end of the character string, it is determined as NO in Step S34-1, and the sound posting processing on the side of the wrist terminal 1 ends.

In a case in which the posting destination word is included at the end of the character string, it is determined as YES in Step S34-1, and the processing advances to Step S35-1.

In Step S35-1, the posting destination determination unit 55 refers to the posting destination storage unit 71, and determines a posting destination corresponding to the posting destination word included at the end thereof.

In Step S36-1, the display control unit 56 controls the output unit 17-1 so as to output to display an image received from the photographing terminal 2, and a character string received from an external sound recognition server.

In Step S37-1, the communication control unit 53 controls the communication unit 19-1 so as to transmit image data and character string data to an SNS server which is a posting destination corresponding to the posting destination word, and performs the posting processing. In addition, upon the transmission, the character string and the image data which are the posting contents are stored in the posting contents information storage unit 72.

Thereafter, the sound posting processing on the side of the wrist terminal 1 ends.

Sound Posting Processing on the Side of Photographing Terminal 2

In Step S31-2, the communication control unit 91 controls the communication unit 19-2 so as to receive a photographing instruction from the wrist terminal 1.

In Step S32-2, the photographing control unit 92 executes photographing processing. In the photographing processing according to the present embodiment, photographing is performed after a predetermined lapse of time by means of the self-timer function. It should be noted that it may be configured so as to transmit a live view image to the wrist terminal 1 during the operation of the self-timer.

In Step S33-2, the communication control unit 91 controls the communication unit 19-2 so as to transmit a photographed image to the wrist terminal 1 as a result of the photographing processing. Thereafter, the sound posting processing at the side of the photographing terminal 2 ends.

Third Embodiment

Although the sound posting processing is executed by a plurality of terminals in the abovementioned embodiments, the present embodiment is configured so as to execute the sound posting processing by a single terminal having a photographing function, a sound input function, and a posting function. In the present embodiment, sound posting processing is executed by providing the sound input function and posting function, in addition to the photography, to the photographing terminal configured as a digital camera, so as to configure as a stand-alone device.

Figure 14:
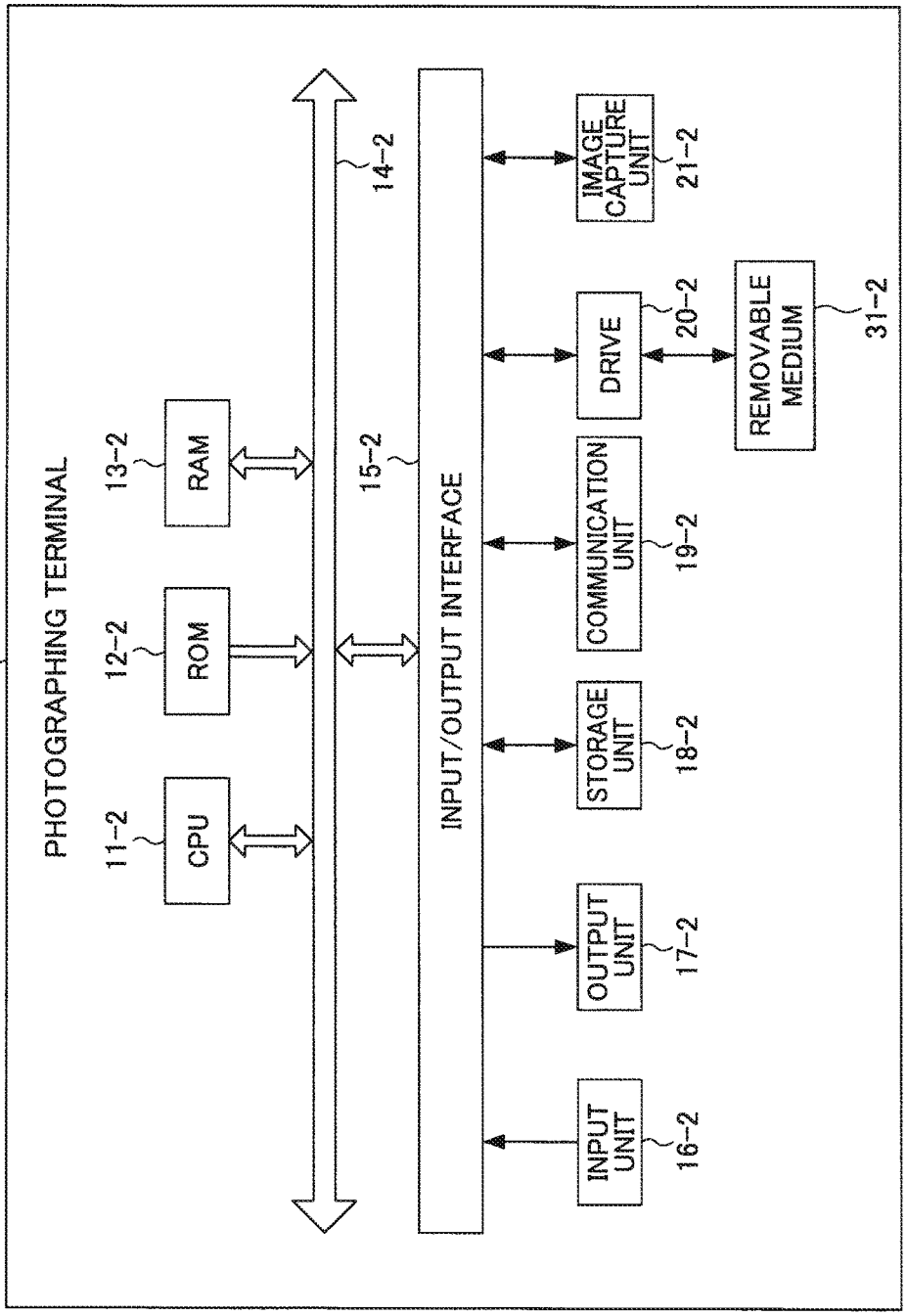
FIG. 14 is a block diagram illustrating a hardware configuration of a photographing terminal according to the present embodiment.

FIG. 14 is a block diagram illustrating a hardware configuration of a photographing terminal 2 according to the present embodiment. It should be noted that, since a hardware configuration added to the present embodiment is identical to the hardware configurations of the abovementioned wrist terminal 1 and the mobile terminal 3, explanations thereof will be omitted.

Figure 15:
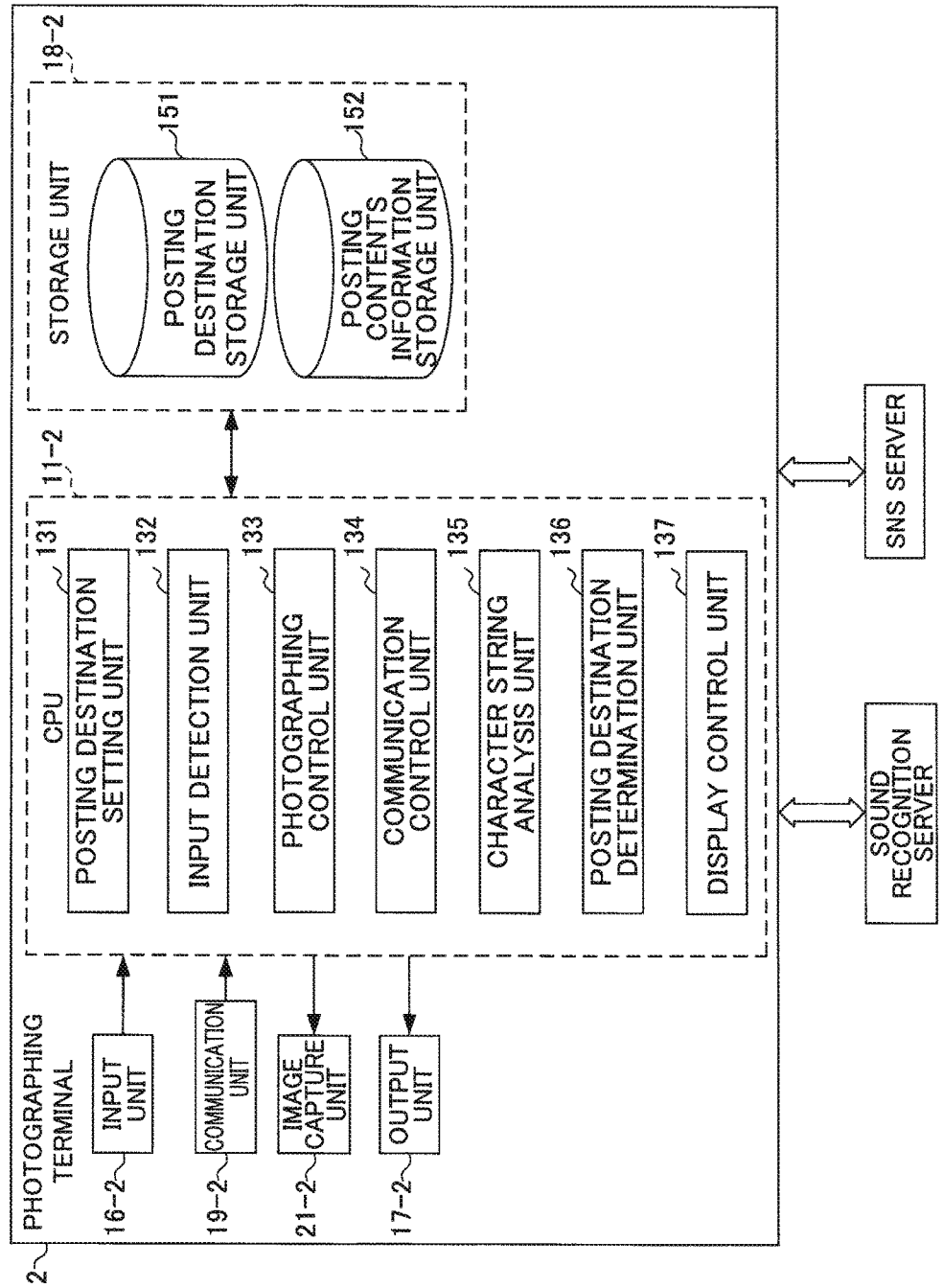
FIG. 15 is a functional block diagram illustrating a functional configuration for executing sound posting processing, among the functional configurations of the photographing terminal of FIG. 14.

FIG. 15 is a functional block diagram illustrating a functional configuration for executing sound posting processing, among the functional configurations of the photographing terminal 2 of FIG. 14. It should be noted that since the functional blocks that are reconfigured in the present embodiment (a posting destination setting unit 131 to a display control unit 137, a posting destination storage unit 151, and a posting contents information storage unit 152) are the same as the abovementioned posting destination setting unit 51, the input detection unit 52, the communication control unit 53, the character string analysis unit 54, the posting destination determination unit 55, the display control unit 56, the posting destination storage unit 71, and the posting contents information storage unit 72, and the communication control unit 91 and the photographing control unit 92 of the mobile terminal 3, explanations thereof will be omitted.

FIG. 16 is a flowchart illustrating a flow of sound posting processing executed by the photographing terminal 2 of FIG. 14, which has the functional configurations of FIG. 15. Upon the start of the sound posting processing, a state is established in which a posting destination word is registered in advance by a user by way of the posting destination setting unit 131, i.e. a state in which posting destination information including an individual account setting and a posting destination word are registered in the posting destination storage unit 71. In addition, the sound posting processing starts when activating a sound posting application by way of a user's operation, etc. to enter a state in which sound input is possible.

It should be noted that, although it is configured to start the sound posting processing by activating the sound posting application to enter the state in which sound input is possible, the present invention is not limited thereto, and it may be configured so that all of the operations are performed by way of sound input. For example, it may be configured to start the sound posting processing by automatically activating the sound posting application according to sound input after entering the state in which sound input is possible.

In Step S51, the input detection unit 132 determines whether sound input has been detected via the input unit 16-2 from a user.

In a case in which the sound input has not been detected, it is determined as NO in Step S51, and enters a standby state.

In a case in which the sound input has been detected, it is determined as YES in Step S51, and the processing advances to Step S52.

In Step S52, the photographing control unit 133 executes photographing processing. In the photographing processing according to the present embodiment, photographing is performed after a predetermined lapse of time by means of the self-timer function. It should be noted that the display control unit 137 may be configured to control the output unit 17-2 so as to display a live view image during the operation of the self-timer.

In Step S53, the communication control unit 134 controls the communication unit 19-2 so as to transmit sound data inputted by sound input to an external sound recognition server.

Thereafter, the sound recognition is executed by the external sound recognition server.

In Step S54, the communication control unit 134 controls the communication unit 19-2 so as to receive a sound recognition result (in the present embodiment, character string data) from the external sound recognition server.

In Step S55, the character string analysis unit 135 analyzes the character string data received from the external sound recognition server and determines whether a posting destination word is included at the end of the character string.

In a case in which the posting destination word is not included at the end of the character string, it is determined as NO in Step S55, and the sound posting processing ends.

In a case in which the posting destination word is included at the end of the character string, it is determined as YES in Step S55, and the processing advances to Step S56.

In Step S56, the posting destination determination unit 136 refers to the posting destination storage unit 71 and determines a posting destination corresponding to the posting destination word included at the end thereof.

In Step S57, the display control unit 137 controls the output unit 17-2 so as to output to display a photographed image and a character string received from an external sound recognition server.

In Step S58, the communication control unit 134 transmits image data and character string data to an SNS server which is a posting destination corresponding to the posting destination word, and performs the posting processing. In addition, upon the transmission, the character string and the image data which are the posting contents are stored in the posting contents information storage unit 152.

Thereafter, the sound posting processing ends.

Conventionally, although the posting to SNS has often been done in the outdoor environment, a sequence has been performed with the operations such as: (1) picking up a terminal, (2) activating an SNS application, (3) inputting characters, (4) activating a camera application, (5) photographing, and (6) tapping a posting button, and thus has required many operations and the like.

However, by implementing the present function which integrally performs photography, character inputting, and posting promptly, the simple sound input to the wrist terminal 1 in the present function allows a user to post "simpler and quicker", which can lead a novel user experience.

The photographing terminal 2 configured as above includes the photographing control unit 133, the input detection unit 132, the photographing control unit 133, and the communication control unit 134.

The photographing control unit 133 acquires an image.

The input detection unit 132 acquires a predetermined sound generated from a user.

The photographing control unit 133 controls so as to acquire an image based on a sound that is the same as the predetermined sound acquired by the input detection unit 132.

The communication control unit 134 controls to store an image in a storage destination which is set in advance according to the contents of the sound that is the same as the predetermined sound acquired by the input detection unit 132.

With such a configuration, it is possible to upload photographed pictures easily to an appropriate location due to acquiring an image by sound input, and performing control to store the image in a storage destination according to the contents of a sound that is the same as the predetermined input sound at the photographing terminal 2.

The communication control unit 134 controls the communication unit 19-3 so as to transmit an instruction to control to convert the sound that is the same as the predetermined sound into character information.

The communication control unit 134 performs control to store character information with the image.

With such a configuration, with the photographing terminal 2, it is possible to store an image and character information by a single sound input, and thus it is possible to upload easily to an appropriate location without complicated operations.

In addition, the photographing terminal 2 further includes the posting destination setting unit 131.

The posting destination setting unit 131 sets the storage destination so as to associate the contents of the sound that is the same as the predetermined sound acquired by the input detection unit 132 with the storage destination.

The communication control unit 134 controls the communication unit 19-3 so as to transmit an instruction to store the image at a storage destination which is set by the posting destination setting unit 131.

With such a configuration, with the photographing terminal 2, it is possible to set a storage destination corresponding to the contents of the sound that is the same as the predetermined sound by a user.

The contents of the sound that is the same as the predetermined sound associated with the storage destination is a keyword associated with the storage destination.

With such a configuration of the photographing terminal 2, since the contents of the sound that is the same as the predetermined sound is a keyword associated with the storage destination, it is easy to recall the storage destination, and thus it is possible to designate an intended storage destination easily.

The contents of the sound that is the same as the predetermined sound associated with the storage destination are contents at the end of the sound that is the same as the predetermined sound.

With such a configuration of the photographing terminal 2, since the contents of the sound that is the same as the predetermined sound are the contents at the end of the sound, the user inputting sound will tend not to obstruct their feeling or impression with the thought for designating a storage destination, and thus it becomes easier for the user to generate sound intuitively.

In addition, the photographing terminal 2 further includes the photographing unit 21-2.

The photographing control unit 133 controls the photographing unit 21-2 so as to perform photography with contents of a specific sound acquired by the input detection unit 132, and acquires the photographed image by the photographing unit 21-2.

With such a configuration of the photographing terminal 2, it is possible to upload photographed pictures easily to an appropriate location without complicated operations.

The photographing control unit 133 controls the image capture unit 21-2 so as to perform self-timer photographing.

With such a configuration of the photographing terminal 2, since it is ensured to perform photography after a predetermined lapse of time from the sound input by means of the self-timer photographing, it becomes easier for a user to recognize the photographing timing.

In addition, the photographing terminal 2 further includes the input unit 16-2 that inputs the sound of the user.

The input detection unit 132 acquires the sound inputted from the input unit 16-2.

With such a configuration of the photographing terminal 2, it is possible allow sound to be inputted to the input unit 16-2 such as the user's microphone to input the sound, and thus, it is possible to perform the operations in an easier manner.

The storage destination is provided outside the electronic apparatus.

With such a configuration of the photographing terminal 2, it is possible to store images, etc. easily in an external storage destination.

The storage destination is a storage server on the Web or a server provided by SNS.

With such a configuration of the photographing terminal 2, it is possible to upload easily to a storage server on the Web or a server provided by SNS.

The posting system S configured as above includes the wrist terminal 1 and the photographing terminal 2.

The wrist terminal 1 includes the input detection unit 52, the communication unit 19-1, and the communication control unit 53.

The input detection unit 52 acquires a sound generated from a user.

The communication unit 19-1 transmits, to the photographing terminal 2, a photographing instruction to photograph a subject based on the sound acquired by the input detection unit 52.

The communication unit 19-1 receives image data captured by the photographing terminal 2 based on the photographing instruction from the photographing terminal 2.

The communication control unit 53 performs control to store the image in a storage destination which is set in advance according to contents of the sound acquired by the input detection unit 52.

The photographing terminal 2 includes the image capture unit 21-2 and the communication unit 19-2.

The communication unit 19-2 receives the photographing instruction transmitted from the communication unit 19-1 of the wrist terminal 1.

The photographing control unit 133 controls the image capture unit 21-2 so as to photograph a subject based on the photographing instruction received at the communication unit 19-2.

The communication unit 19-2 transmits the image data to the wrist terminal 1.

With such a configuration of the photographing terminal 2, due to acquiring the image by the sound input and controlling to store the image in the storage destination according to the contents of the sound inputted, it is possible to upload photographed pictures easily to an appropriate location without complicated operations.

It should be noted that the present invention is not to be limited to the aforementioned embodiments, and that modifications, improvements, etc. within a scope that can achieve the objects of the present invention are also included in the present invention.

Although the sound recognition is performed by the external sound recognition server in the abovementioned embodiments, it may be configured so as to build in a sound recognition function and perform processing relating to sound recognition with the user's own device. In addition, it may be configured so as to perform photography in a case of a specific character string being included in a sound recognition result. With such a configuration, as compared to the case of photographing when a sound is inputted, timeliness decreases; however, since photographing is not performed when a specific character string is not included, unnecessary photographing is no longer performed.

In addition, although it is configured to store in different external storage destinations in the abovementioned embodiments, it may be configured to perform control to store in a more specific storage location (such as folder) irrespective of being internal/external.

In addition, although the sound contents at the end of the specific character string are included in the posting contents in the abovementioned embodiments, a portion excluding the sound contents at the end thereof may be set as the posting contents. In addition, although the specific character string is set to be located at the end in the abovementioned embodiments, the present invention is not limited thereto, and it may be configured so that the specific character string is located at the top, between significant sound contents (for example, words), at an arbitrary specific location, or simply included in the sound contents.

In addition, although the keywords associated with the posting destinations which directly or indirectly recall the posting destinations as the storage destination for the specific character string at the end, i.e. "now" and "like", are set in the abovementioned embodiments, it may be configured so that a user can set these character strings freely.

In addition, although it is configured to perform posting with an image and text in the configuration of the sound contents being an arbitrary character string+a specific character sequence at the end in the abovementioned embodiments, it may be configured to perform posting with only an image (storing to a corresponding storage destination) in a case of there being only a specific character string such as "now" and "like". In such a case, it may also be configured to post with the specific character sequence along with the image (storing to a corresponding storage destination).

In addition, although it is configured so as to determine using all of the sound inputted in the abovementioned embodiments, it may be configured so as to use a portion of the sound inputted. For example, in a case of a specific character string being located at the end, it may be configured to use only a character string immediately before the end.

In addition, although it is configured to compare and determined the sound contents at the text level by performing the sound recognition, it may be configured to compare the sound inputted with the sound data stored in advance for such determination. In such a case, whether the sound contents match or not may be simply determined or whether the sound contents at the voiceprint level match or not may be determined for the purpose of improving security. In addition, regarding the posting contents, it may be configured to perform with a sound file in place of text.

In the aforementioned embodiments, explanations are provided with the example of the wrist terminal 1, the photographing terminal 2, and the mobile terminal 3 to which the present invention is applied being a smart watch, a digital camera, and a smart phone; however, the present invention is not limited thereto in particular.

For example, the present invention can be applied to any electronic device in general having a sound posting processing function. More specifically, for example, the present invention can be applied to a laptop personal computer, a printer, a television receiver, a video camera, a portable navigation device, a cell phone device, a portable gaming device, and the like.

The processing sequence described above can be executed by hardware, and can also be executed by software.

In other words, the hardware configurations of FIGS. 7, 8, 9 and 15 are merely illustrative examples, and the present invention is not particularly limited thereto. More specifically, the types of functional blocks employed to realize the above-described functions are not particularly limited to the examples shown in FIGS. 7, 8, 9 and 15, so long as the wrist terminal 1, the photographing terminal 2, and the mobile terminal 3 can be provided with the functions enabling the aforementioned processing sequence to be executed in its entirety.

A single functional block may be configured by a single piece of hardware, a single installation of software, or a combination thereof.

In a case in which the processing sequence is executed by software, the program configuring the software is installed from a network or a storage medium into a computer or the like.

The computer may be a computer embedded in dedicated hardware. Alternatively, the computer may be a computer capable of executing various functions by installing various programs, e.g., a general-purpose personal computer.

The storage medium containing such a program can not only be constituted by the removable media 31-1, 31-2, and 31-3 of FIGS. 4, 5, 6, and 14 distributed separately from the device main body for supplying the program to a user, but also can be constituted by a storage medium or the like supplied to the user in a state incorporated in the device main body in advance. The removable media 31-1, 31-2, and 31-3 is composed of, for example, a magnetic disk (including a floppy disk), an optical disk, a magnetic optical disk, or the like. The optical disk is composed of, for example, a CD-ROM (Compact Disk-Read Only Memory), a DVD (Digital Versatile Disk), Blu-ray (Registered Trademark) or the like. The magnetic optical disk is composed of an MD (Mini-Disk) or the like. The storage medium supplied to the user in a state incorporated in the device main body in advance is constituted by, for example, ROM 12-1, 12-2, and 12-3 of FIGS. 4, 5, 6, and 14 in which the program is recorded or a hard disk, etc. included in the storage unit 18-1, 18-2, and 18-3 of FIGS. 4, 5, 6, and 14.

It should be noted that, in the present specification, the steps defining the program recorded in the storage medium include not only the processing executed in a time series following this order, but also processing executed in parallel or individually, which is not necessarily executed in a time series.

In addition, in the present specification, a term system shall mean a general device configured from a plurality of devices, a plurality of means, and the like.

The embodiments of the present invention described above are only illustrative, and are not to limit the technical scope of the present invention. The present invention can assume various other embodiments. Additionally, it is possible to make various modifications thereto such as omissions or replacements within a scope not departing from the spirit of the present invention. These embodiments or modifications thereof are within the scope and the spirit of the invention described in the present specification, and within the scope of the invention recited in the claims and equivalents thereof.

What is claimed is:

1. An electronic apparatus comprising:
an image acquisition section that acquires an image;
a sound acquisition section that acquires a predetermined sound generated from a user; and
a computing device which is operable to function as units including:
an image acquisition control unit that controls the image acquisition section so as to acquire the image based on a sound that is the same as the predetermined sound acquired by the sound acquisition section;
a sound conversion control unit that performs control to convert the sound that is the same as the predetermined sound into character information, and
a storage control unit that performs control to store the image and the character information converted from the sound in a storage destination which is set in advance corresponding to contents of the sound that is the same as the predetermined sound acquired by the sound acquisition section and the contents of the sound has multiple words including a keyword related to the storage destination.

2. The electronic apparatus according to claim 1,
wherein the computing device has a function of a storage destination setting unit that sets the storage destination so as to associate the contents of the sound that is the same as the predetermined sound acquired by the sound acquisition section, with the storage destination, and
the storage control unit stores the image in the storage destination which is set by the storage destination setting unit.

3. The electronic apparatus according to claim 1,
wherein the contents of the sound that is the same as the predetermined sound associated with the storage destination includes the keyword that is at the end of the sound that is the same as the predetermined sound.

4. The electronic apparatus according to claim 1,
further comprising a photographing section,
wherein the computing device further includes a function of a photographing control unit that controls the photographing section,
the photographing control unit controls the photographing section so as to perform photography based on the sound that is the same as the predetermined sound acquired by the sound acquisition section, and
the image acquisition section acquires an image photographed by the photographing section.

5. The electronic apparatus according to claim 4,
wherein the photographing control unit controls the photographing section so as to perform self-timer photographing.

6. The electronic apparatus according to claim 1,
further comprising a sound input section that inputs a user's predetermined sound,
wherein the sound acquisition section acquires the predetermined sound inputted by the sound input section.

7. The electronic apparatus according to claim 1,
wherein the storage destination is provided outside of the electronic apparatus.

8. The electronic apparatus according to claim 1,
wherein the storage destination is a storage server on the Web or a server provided by a SNS (Social Networking Service).

9. The electronic apparatus according to claim 1,
wherein the character information is a sentence.

10. A system comprising a first apparatus and a second apparatus, wherein
the first apparatus includes:
a sound acquisition section that acquires a predetermined sound generated from a user;
a first transmission section that transmits, to the second apparatus, a photographing instruction to photograph a subject based on a sound that is the same as the predetermined sound acquired by the sound acquisition section;
a first receiving section that receives image data photographed by the second apparatus based on the photographing instruction from the second apparatus; and a first computing device that has, as a function, a sound conversion control unit that performs control to convert the sound that is the same as the predetermined sound into character information, and a storage control unit that performs control to store the image and the character information converted from the sound in a storage destination which is set in advance corresponding to contents of the sound that is the same as the predetermined sound acquired by the sound acquisition section and the contents of the sound has multiple words including a keyword related to the storage destination, and wherein the second apparatus includes:

a photographing section;

a second receiving section that receives the photographing instruction transmitted from the first transmission section of the first apparatus;

a second computing device that has, as a function, a photographing control unit that controls the photographing section so as to photograph a subject based on the photographing instruction received by the second receiving section; and a second transmission section that transmits the image data to the first apparatus.

11. A storage control method executed by an electronic apparatus, the method comprising the steps of:

acquiring an image;

acquiring a predetermined sound generated from a user;

controlling so as to acquire the image in the step of acquiring an image based on a sound that is the same as the predetermined sound acquired in the step of acquiring the sound; and controlling to convert the sound that is the same as the predetermined sound into character information, and controlling to store the image and the character information converted from the sound in a storage destination which is set in advance corresponding to contents of the sound that is the same as the predetermined sound acquired in the step of acquiring the sound and the contents of the sound has multiple words including a keyword related to the storage destination.

12. The storage control method according to claim 11, further comprising a step of setting the storage destination so as to associate the contents of the sound that is the same as the predetermined sound acquired in the step of acquiring the sound, with the storage destination, wherein the step of controlling to store the image stores the image in the storage destination which is set in the step of setting.

13. The storage control method according to claim 11, wherein the contents of the sound that is the same as the predetermined sound associated with the storage destination includes the keyword that is at the end of the sound that is the same as the predetermined sound.

14. The storage control method according to claim 11, wherein the character information is a sentence.

15. A non-transitory storage medium encoded with a computer-readable program that enables a computer to execute functions as:

an image acquisition unit that acquires an image;

a sound acquisition unit that acquires a predetermined sound generated from a user;

an image acquisition control unit that controls the image acquisition unit so as to acquire the image based on a sound that is the same as the predetermined sound acquired by the sound acquisition unit;

a sound conversion control unit that performs control to convert the sound that is the same as the predetermined sound into character information, and a storage control unit that performs control to store the image and the character information converted from the sound in a storage destination which is set in advance corresponding to contents of the sound that is the same as the predetermined sound acquired by the sound acquisition unit and the contents of the sound has multiple words including a keyword related to the storage destination.

16. The non-transitory storage medium according to claim 15, wherein the character information is a sentence.

* * * * *